US012592152B2

(12) United States Patent
Uoshita

(10) Patent No.: US 12,592,152 B2
(45) Date of Patent: Mar. 31, 2026

(54) NAVIGATION PLANNING SYSTEM AND NAVIGATION PLANNING METHOD

(71) Applicant: Furuno Electric Co., Ltd., Nishinomiya (JP)

(72) Inventor: Seiichi Uoshita, Nishinomiya (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 91 days.

(21) Appl. No.: 18/523,919

(22) Filed: Nov. 30, 2023

(65) Prior Publication Data

US 2025/0182626 A1      Jun. 5, 2025

(51) Int. Cl.
| | |
|---|---|
| *G08G 3/02* | (2006.01) |
| *B63B 79/40* | (2020.01) |
| *G05D 1/00* | (2006.01) |
| *G05D 1/633* | (2024.01) |

(52) U.S. Cl.
CPC .............. G08G 3/02 (2013.01); B63B 79/40 (2020.01); G05D 1/0206 (2013.01)

(58) Field of Classification Search
CPC ......... G08G 3/02; B63B 79/40; G05D 1/0206
See application file for complete search history.

(56) References Cited

U.S. PATENT DOCUMENTS 11,473,914 B2 * 10/2022 Yamabayashi ....... G01C 21/203
12,448,095 B2 * 10/2025 Uoshita .................... G08G 3/02

2020/0035106 A1    1/2020  Suzuki et al.
2020/0310434 A1    10/2020  Chung et al.
2021/0125502 A1 *  4/2021  Mansor ................. G05D 1/693
(Continued)

FOREIGN PATENT DOCUMENTS

| EP | 4290496 A1 | 12/2023 |
|---|---|---|
| JP | H09-22499 A | 1/1997 |
| JP | 7621982 B2 * | 1/2025 |

(Continued)

OTHER PUBLICATIONS

Extended European search report issued on May 14, 2024, in corresponding European patent Application No. 23211996.6, 8 pages.

(Continued)

*Primary Examiner* — David P. Merlino
*Assistant Examiner* — Mahmoud M Kazimi
(74) *Attorney, Agent, or Firm* — XSENSUS LLP

(57) ABSTRACT

A navigation planning system of the present invention comprises a processing circuitry configured to acquire planned route information indicating a movable body on the water; acquire movable body information including a position, a moving direction, and a speed of the movable body; acquire obstacle information including each of a position, a moving direction, and a speed of a plurality of obstacles located in the surrounding area of the movable body; calculate a collision risk indicating a risk level of collision between the movable body and the obstacle based on the movable body information and the obstacle information; calculate congestion risk indicating a degree of approaching a plurality of obstacles simultaneously based on each of the collision risk between the movable body and the obstacle; and determine the necessity of evasion by comparing the congestion risk with a threshold value.

15 Claims, 17 Drawing Sheets

(56)            References Cited

U.S. PATENT DOCUMENTS

2023/0406461  A1    12/2023  Uoshita

FOREIGN PATENT DOCUMENTS

WO          2019/121237  A1     6/2019
WO      WO-2019127076  A1 *   7/2019  ......... G01C 21/3807
WO          2021/149448  A1     7/2021

OTHER PUBLICATIONS

Extended European search report issued on May 14, 2024, in corresponding European patent Application No. 23211993.3, 6 pages.

* cited by examiner

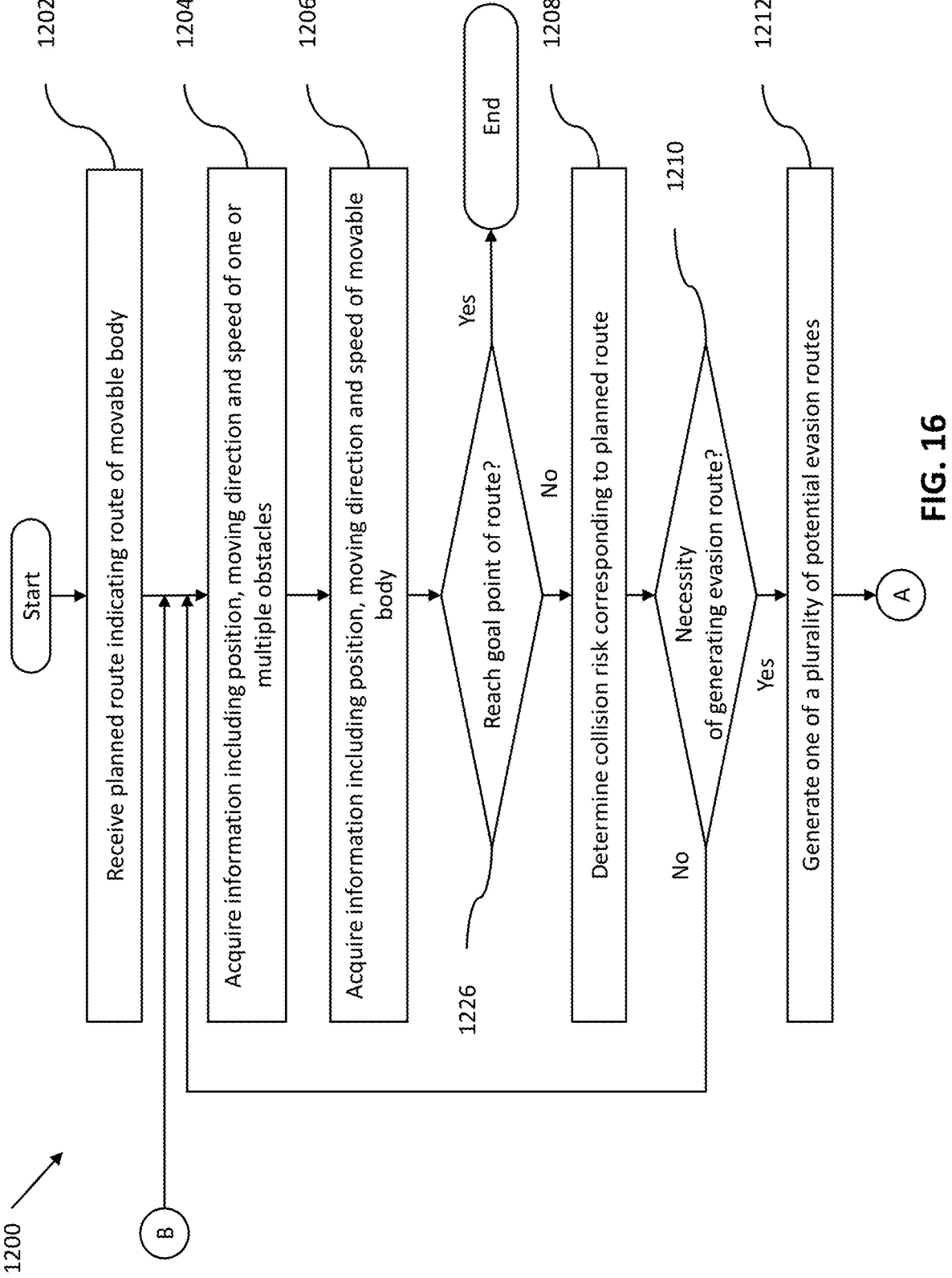

1200

1202 — Receive planned route indicating route of movable body

1204 — Acquire information including position, moving direction and speed of one or multiple obstacles 1206 — Acquire information including position, moving direction and speed of movable body 1226 — Reach goal point of route?
Yes → End
No 1208 — Determine collision risk corresponding to planned route 1210 — Necessity of generating evasion route?
Yes
No 1212 — Generate one of a plurality of potential evasion routes

A

B

Start

FIG. 16

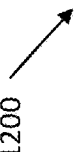

1214 — Calculate collision risk and congestion risk for each of potential evasion route 1216 — Calculate distances between staring point and return point on planned route for planned route and each potential evasion route 1218 — Exclude potential evasion route whose collision risk exceeds planned route collision risk 1220 — Exclude potential evasion route whose congestion risk exceeds congestion risk threshold 1222 — Select evasion route whose distance between staring point and return point is the shortest 1224 — Change planned route to selected evasion route between staring point and return point is the shortest

NAVIGATION PLANNING SYSTEM AND NAVIGATION PLANNING METHOD

TECHNICAL FIELD

The present invention relates primarily to a vessel navigation system and method for safely navigating a vessel, and more specifically, to a navigation planning system and a route planning method for safely navigating a vessel by avoiding collision with a plurality of obstacles around an own vessel.

BACKGROUND

In general, a vessel or other movable body establishes a planned route for a voyage from a departure point to a destination before beginning the navigation. Currently, movable bodies such as vessels may have navigation systems and devices for generating planned routes and monitoring planned routes in order to safely move movable bodies.

In these conventional navigation planning systems, movable bodies such as own vessels acquire movable body information and obstacle information using a plurality of sensor units in order to detect, identify, and track their own positions and the positions of nearby obstacles and other vessels on the planned route in order to avoid collisions with other obstacles such as other vessels.

Patent document 1: US2020/0310434

SUMMARY

While navigating the planned route, the planned route may have to be changed due to artificial factors such as the appearance of nearby obstacles or other vessels that may cross the planned route. In addition, the planned route may have to be changed due to natural factors such as sudden changes in ocean conditions, tides, or other disturbance factors.

For this reason, vessel operators must safely navigate movable bodies such as own vessels along the planned route, avoiding collisions with surrounding obstacles and other vessels, and may need assistance navigating ocean conditions and tides.

The problem to be solved by the present invention is to provide systems, devices, and methods that support vessel operators to safely navigate movable bodies by responding to the above requirements and avoiding collisions with multiple obstacles and other vessels.

The navigation planning system comprises: processing circuitry for acquiring planned route information indicating a planned route of a movable body moving on water; acquiring movable body information including a position and a moving direction of the movable body; and acquiring obstacle information including a position and a moving direction for each of a plurality of obstacles located around the movable body.

Then, the processing circuitry calculates a collision risk indicating the degree of risk of collision between the movable body and each obstacle of the plurality of obstacles based on movable body information and obstacle information; calculates a congestion risk indicating the degree of simultaneous approach of the plurality obstacles included in the congestion risk obstacle based on the collision risk corresponding to each of the obstacles included in the congestion risk obstacle; and determines the necessity of navigation of an evasion route having a route different from the planned route based on the congestion risk.

The movable body information may further include the moving speed of the movable body, and the obstacle information may include the moving speed of the obstacle, which may be calculated from the position and orientation detected at a predetermined period.

Here, the processing circuitry compares the congestion risk threshold set for the congestion risk with the congestion risk and outputs the congestion risk evaluation result, and the necessity of navigation of the evasion route may be determined based on the congestion risk evaluation result.

Further, the processing circuitry selects a maximum collision risk obstacle corresponding to the maximum collision risk among the obstacles; outputs the maximum collision risk evaluation result by comparing the collision risk threshold set for the maximum collision risk with the maximum collision risk, and the necessity of navigation of the evasion route may be determined based on the congestion risk evaluation result and the maximum collision risk evaluation result.

The processing circuitry sets an evasion route different from the planned route to a part or all of the unnavigated routes of the movable body among the planned routes when the risk evaluator determines that the evasion route setting is necessary.

The processing circuitry generates a potential evasion route that is a candidate for one or more evasion routes different from the planned route between an evasion starting point and a return point on the unnavigated route of the planned route, and selects an evasion route from among the potential evasion routes.

In the processing circuitry may calculate the congestion risk of the planned route based on the logical sum of the plurality of collision risks including the maximum collision risk among the plurality of collision risks. Alternatively, the congestion risk of the planned route may be calculated based on the logical sum of the collision risks excluding the maximum collision risk among the collision risks.

The processing circuitry may calculate the congestion risk based on the collision risk corresponding to the selected plurality of obstacles among the plurality of obstacles corresponding to the obstacle information acquired by the obstacle information acquiring module. The processing circuitry may calculate the congestion risk based on the collision risk corresponding to the respective obstacles of the second large collision risk group including the second large collision risk obstacle corresponding to the second large collision risk of the collision risk next to the maximum collision risk and the obstacle having the collision risk smaller than the second large collision risk.

In the navigation planning system, the processing circuitry may calculate a congestion risk of a planned route and a congestion risk of an evasion route based on the logical sum of a plurality of collision risks.

Here, the processing circuitry may calculate a maximum collision risk for each of one or a plurality of potential evasion routes, and calculate a congestion risk for each of one or a plurality of potential evasion routes.

The processing circuitry may calculate a maximum collision risk when a movable body navigates the potential evasion route for each of the potential evasion routes, select a potential evasion route whose maximum collision risk is less than or equal to a predetermined threshold as the evasion route, determine whether the maximum collision risk corresponding to the selected evasion route is less than the maximum collision risk for the planned route, and determine that navigation of the evasion route is necessary when the maximum collision risk is small.

Here, the processing circuitry may calculate the evasion route congestion risk in the case where the movable body navigates the selected evasion route, and determine that the navigation of the selected evasion route is necessary when the evasion route congestion risk is smaller than the congestion risk for the planned route.

The processing circuitry may further determine the necessity of the evasion by taking into account the distance of each potential evasion route navigated by the movable body for each potential evasion route.

The processing circuitry may select the potential evasion route for which the distance navigated by the movable body is the minimum among potential evasion routes whose maximum collision risk and congestion risk are both equal to or less than a predetermined threshold.

In the navigation planning system of the present invention, obstacle information may include information detected by at least one of radar, lidar, sonar, or image sensors mounted on the movable body, information received by an automatic identification system receiver, information transmitted by another ship other than the movable body, or information detected by radio communication at a location other than the movable body. The obstacle information may also include at least one of another ship, tidal current, weather, reef, or stranded ship.

The navigation planning system of the present invention may further include a display for displaying an evasion route along with a planned route on a display image. It may further include a route planning unit for providing one or more routes for navigation of a movable body from a port of departure to a destination, and one or a plurality of sensors for obtaining fault information.

The route planning method of the present invention, comprises: acquiring planned route information indicating a movable body on the water; acquiring movable body information including the position, moving direction and speed of the movable body; acquiring obstacle information including each of position, moving direction and speed of a plurality of obstacles located in the surround area of the movable body; calculating a collision risk indicating a risk level of collision between the movable body and the obstacle based on the movable body information and the obstacle information; calculating congestion risk indicating a degree of approaching a plurality of obstacles simultaneously based on each of the collision risk between the movable body and the obstacle; and determining the necessity of evasion by comparing the congestion risk with the threshold value.

The navigation route planning method may further comprises: selecting a maximum collision risk obstacle corresponding to the maximum collision risk among the obstacles; comparing the maximum collision risk with a maximum collision risk threshold, and determining the necessity of evasion by comparing the congestion risk value with the threshold.

For a congestion risk obstacle including one or a plurality of obstacles including the maximum collision risk obstacle, a congestion risk indicating the degree of simultaneous approach of the obstacles included in the congestion risk obstacle may be calculated based on the collision risk corresponding to each of the obstacles included in the congestion risk obstacle, and the necessity of navigation of an evasion route having a route different from the planned route of the movable body is determined based on the congestion risk.

The necessity of navigation of the evasion route may be determined by comparing the congestion risk threshold set for the congestion risk with the congestion risk. The necessity of navigation of the evasion route may be determined by comparing the collision risk threshold set for the maximum collision risk with the maximum collision risk.

In the route planning method of the present invention, when it is determined that the setting of the evasion route is necessary, an evasion route different from the planned route may be set for part or all of the unnavigated routes of the movable body among the planned routes.

Further, a potential evasion route which is a candidate for one or more evasion routes of a route different from the planned route may be generated between the evasion starting point and the planned route return point on the unnavigated route, and the evasion route may be selected from among the potential evasion routes. Furthermore, the congestion risk of the planned route may be calculated based on the logical sum of the plurality of collision risks excluding the maximum collision risk among the plurality of collision risks.

In the navigation planning system of the present invention, the maximum collision risk may be calculated for each of the potential evasion routes and the congestion risk may be calculated for each of the potential evasion routes.

The maximum collision risk when the movable body navigates the potential evasion route may be calculated for each of the potential evasion routes, the potential evasion route whose maximum collision risk is less than or equal to a predetermined threshold may be selected as the evasion route, the maximum collision risk corresponding to the selected evasion route may be determined to be less than the maximum collision risk for the planned route, and the navigation of the evasion route may be determined to be necessary when the maximum collision risk is less than the maximum collision risk for the planned route.

Among the potential evasion routes whose maximum collision risk and congestion risk are both less than or equal to the predetermined threshold, the potential evasion route whose distance navigated by the movable body may be minimized may be selected as the evasion route.

A route planning program according to the present invention is an executable program which, when executed by a computer, causes a computer to acquire planned route information indicating a planned route of a movable body moving on water, causes the computer to acquire movable body information including a position, a moving direction and a moving speed of the movable body, causes the computer to acquire obstacle information including a position, a moving direction and a moving speed of each of a plurality of obstacles in the vicinity of the movable body, causes the computer to calculate a collision risk indicating a risk degree of collision between the movable body and each obstacle based on the movable body information and the obstacle information, and causes the computer to select a maximum collision risk obstacle corresponding to the maximum collision risk among the obstacles; The congestion risk indicating the degree of simultaneous approach of the obstacles included in the congestion risk obstacle is calculated based on the collision risk corresponding to each of the obstacles included in the congestion risk obstacle with respect to the congestion risk obstacle including the maximum collision risk obstacle, and the necessity of navigation of the evasion route having a route different from the planned route of the movable body is determined based on the congestion risk.

In this specification, the term "risk" such as "collision risk" and "congestion risk" is described, but the risk is quantified based on a predetermined rule and may be referred to as the degree of risk. The "collision risk" is calculated by quantifying the degree of likelihood of collision with an obstacle (e.g. vessel) that has a risk of collision according to a predetermined standard, and "congestion risk" is calculated by quantifying the degree of likelihood of collision with any of the plurality of obstacles when there are a plurality of obstacles that have a risk of collision according to a predetermined standard.

The planned route is not limited to all routes from the point of departure to the point of destination, and it may be a route of the planned route that is ahead of the current position of the movable body that has already sailed and is underway, or it may be a planned route that is ahead of the predicted position that it will pass in the future. In addition, an evasion route of the movable body may be generated instead of the planned route, and the above may be applied instead of the planned route.

The "Congestion risk" is a concept indicating the degree of simultaneous approach of obstacles included in the congestion risk obstacle based on the collision risk corresponding to each of the plurality of obstacles that may become congestion risk. As an example, the congestion risk of the planned route is calculated based on the plurality of collision risks ranging from zero, which indicates a state in which there is no congestion risk, to 1, in which the congestion risk is the same as the maximum collision risk, which indicates the maximum collision risk among the obstacles. Here, the range of the congestion risk is a number ranging from 0 to 1 but is not limited thereto.

Furthermore, the congestion risk of the evasion route is determined. The congestion risk calculator calculates the congestion risk of the planned route and the evasion route based on the plurality of collision risks excluding the maximum collision risk among the plurality of collision risks. As an example of the calculation of the congestion risk based on the plurality of collision risks excluding the maximum collision risk, the logical sum of the respective collision risks to be calculated is calculated, and this is designated as the congestion risk.

However, the calculation based on the logical sum is only an example, and it is not limited to the above example if it is possible to show the number according to the degree of simultaneous approach of obstacles, such as adding the number after multiplying by the higher coefficient in order of the collision risk, instead of simply using the logical sum.

As will be described in detail in the section of the form for implementing the invention, both the inclusion and the exclusion of the obstacle with the maximum risk as the object of the congestion risk calculation are meaningful and can be adopted.

To solve the problem that there is no way to display visual information intuitively available for a vessel operator to navigate safely by generating an evasion route ahead of the current position or the predicted position of a movable body when multiple obstacles are detected on a planned route.

The navigation planning system of the present invention enables a vessel operator to safely navigate a movable body such as an own vessel by avoiding collision with a plurality of surrounding obstacles such as a vessel to be an obstacle and a terrain on an evasion route displayed on a screen of a display part.

BRIEF DESCRIPTION OF DRAWINGS

Embodiments illustrated for means to solve the problem will be better understood by reference to the drawings. Here, similar portions are designated by similar numerals throughout. The following description is intended solely as an implementation mobile and simply illustrates certain selected embodiments of systems, devices and methods consistent with the challenges claimed herein and the means for solving them.

FIG. 16 is a part of a flowchart showing a route planning method according to an embodiment of the present invention; and FIG. 17 is a part of a flowchart following the flowchart shown in FIG. 16.

DETAILED DESCRIPTION OF THE EMBODIMENTS

Figure 1:
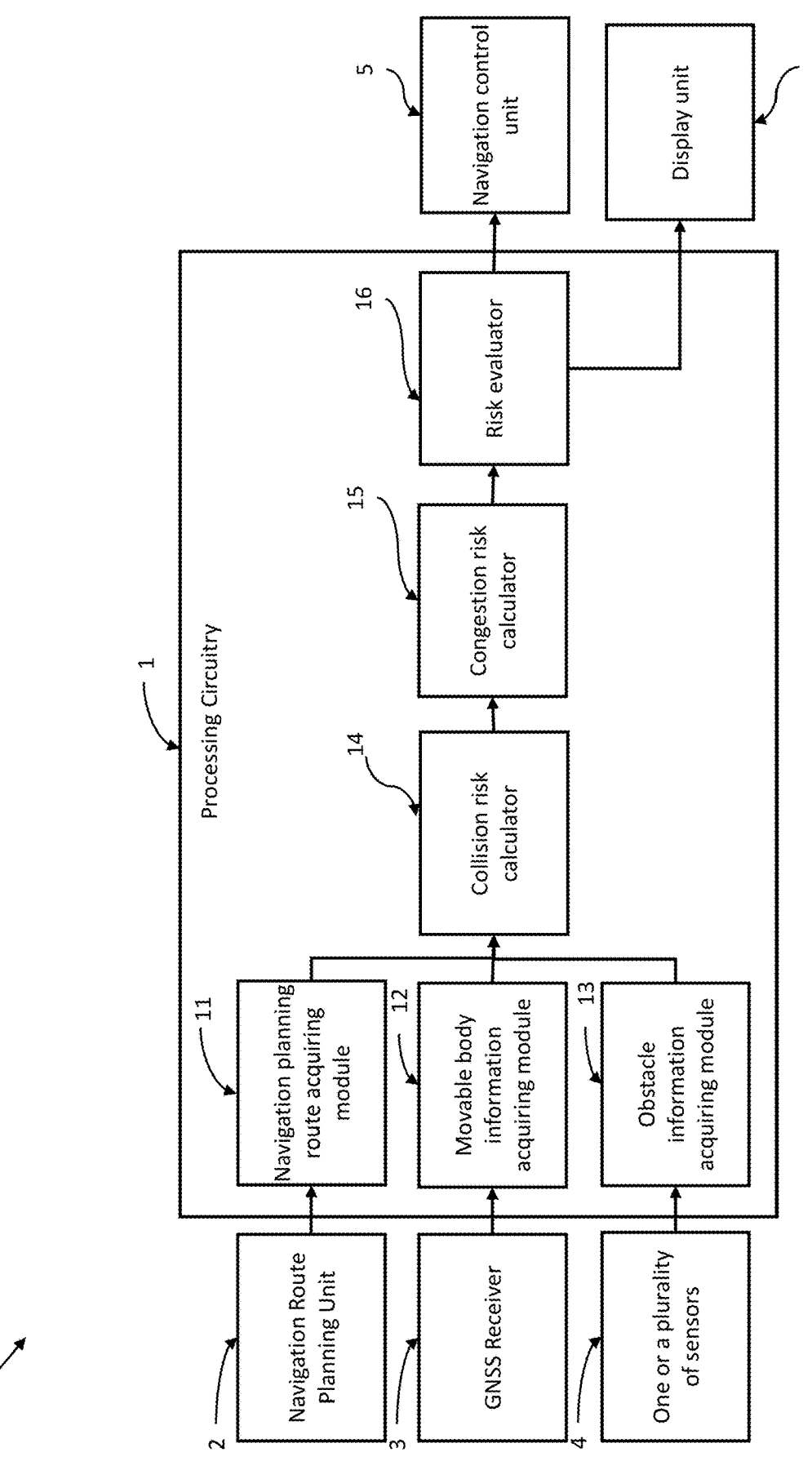
FIG. 1 is a block diagram illustrating the configuration of a navigation planning system for safely navigating a movable body moving over water by operation such as an own vessel, in accordance with an embodiment of the navigation planning system of the present invention.

Embodiments of the navigation planning system of the present invention will now be described with examples. Other exemplary embodiments or features may be further utilized, and other modifications may be made without departing from the spirit or scope of the subject matter presented herein.

The exemplary embodiments described herein are not limited. It will be readily appreciated that the embodiments of the present invention described herein generally and illustrated in the drawings may be arranged, substituted, combined, separated, and designed in a wide variety of different configurations as expressly contemplated herein.

In the following detailed description, reference is made to the accompanying drawings, some of which are incorporated herein.

Figure 2:
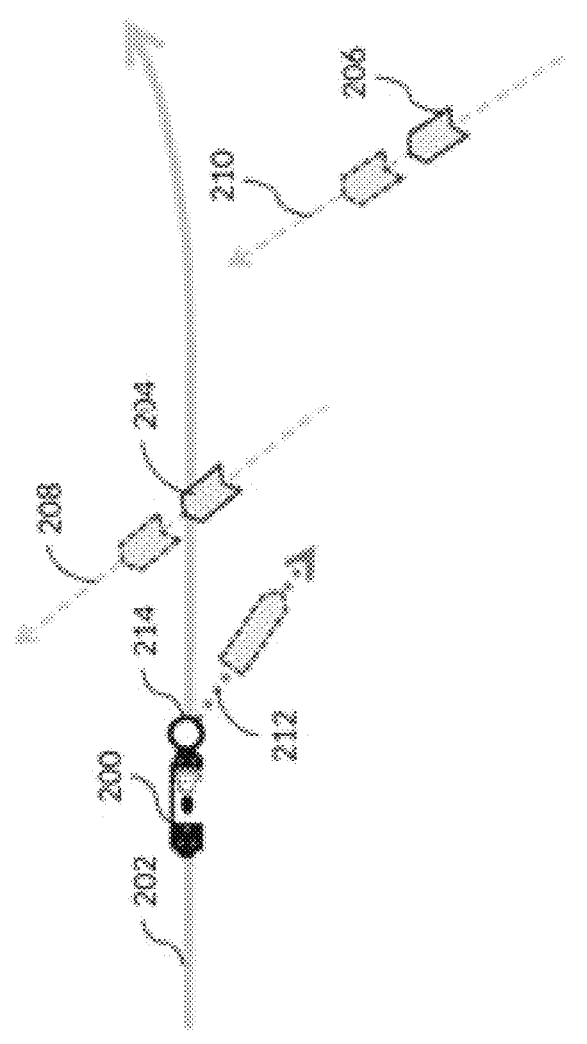
FIG. 2 is a diagram for the description of an embodiment showing a positional relationship between an own vessel and another vessel in an area surrounding the own vessel.
Figure 3:
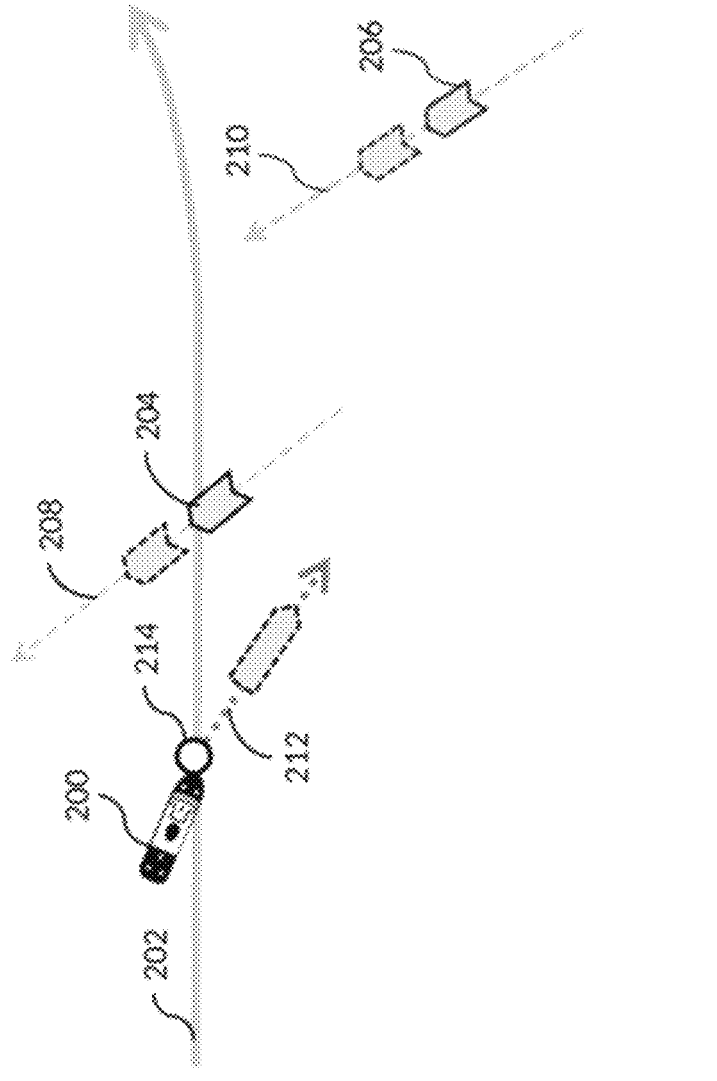
FIG. 3 is a diagram for the description of an embodiment showing a positional relationship between an own vessel and another vessel in an area surrounding the own vessel, wherein the own vessel is on a planned route but oriented in a direction inclined with respect to the course.

FIG. 1 is a block diagram showing a configuration of a navigation planning system 100 for safely navigating a movable body 200 according to an embodiment of the present invention. FIGS. 2 and 3 illustrate a predetermined area surrounding an own vessel 200 according to an embodiment of the navigation planning system of the present invention. Hereinafter, the movable body 200 will also be referred to as the own vessel 200 as appropriate.

The navigation planning system 100 may be provided on the own vessel 200 itself to navigate the own vessel 200 from the departure point (port) to the destination. Once the voyage has commenced, the navigation planning system 100 monitors whether own vessel 200 is navigating properly along a planned route 202, which is the route that the own vessel 200 should follow between the port of departure and the destination.

The navigation planning system 100 is used for the purpose of ensuring that the own vessel 200 can navigate safely, avoiding collisions with vessels identified as obstacles, adverse sea conditions, weather, and other obstacles around it. Vessel operators, i.e., operators operating the own vessel 200, may navigate the own vessel 200 along the planned route 202 with the assistance of the navigation planning system 100.

As shown in FIGS. 2 and 3, in this embodiment, the planned route 202 is the route that the own vessel 200 should follow in order to navigate and safely reach its destination, and the planned route 202 shows the route of the own vessel 200 and the course direction from the current position of the own vessel 200.

A navigation route planning unit 2 is configured to store multiple routes for the navigation of the own vessel 200. In this embodiment, the vessel operator may operate various peripherals operatively connected to the navigation planning system 100 to perform various functions according to the functions of the navigation planning system. For example, the user can provide various instructions to the navigation planning system 100 regarding the location of the departure point and the destination of the navigation of the own vessel 200 by operating a peripheral device such as a keyboard or mouse.

The navigation route planning unit 2 may provide one or more routes for the navigation of the own vessel 200 from the departure point to the destination based on information such as the source location and the destination obtained from the user. In this embodiment, each route can include the date and time of the navigation, weather conditions, tidal conditions, and the like, and may be associated with this information.

The navigation route planning unit 2 receives user input from the vessel operator or an associated person for the selection of a route as planned route 202 for the navigation of the own vessel 200 from the location of the port of departure to the destination. In this embodiment, the vessel operator selects a route to travel, but as another embodiment, the optimal route may be selected based on the current weather conditions, travel time, tidal or tidal current conditions, and the like, at the discretion of the navigation route planning unit 2 itself.

The navigation planning system 100 utilizes information related to the movable body 200, such as another vessel, and a plurality of obstacles 204, 206 in the area surrounding the own vessel 200 to safely navigate the own vessel 200 from its origin to its destination along the planned route 202. A global navigation satellite system (GNSS) receiver 3, typically mounted on the own vessel 200, acquires movable body information, such as a location, a direction of travel, and a speed of the own vessel 200. The GNSS receiver 3 receives a satellite signal and accurately acquires the movable body information related to the own vessel 200.

One or a plurality of sensors 4 acquires obstacle information including a position, a direction of movement, and a speed of a plurality of obstacles 204 and 206 that may prevent navigation of the own vessel 200. The one or the plurality of sensors 4 may correspond to one or more navigation electronic devices. A specific configuration of the one or the plurality of sensors 4 is a device having a detection or sensing function such as a radio detection and ranging (RADAR) device, a light detection and ranging (LIDAR) device, an acoustic navigation and ranging (SONAR) device, an automatic identification system (AIS) receiver, and an image sensor such as a camera or video recorder mounted on the own vessel 200. The one or the plurality of sensors 4 may detect an obstacle of navigation of the own vessel 200, not only the above, but also information transmitted from another ship, a land management station or the like.

In this embodiment, the obstacle information includes information detected by any or at least one of radar, LIDAR device, SONAR device, and image sensor, information acquired by an AIS receiver, information transmitted from other vessels, and information acquired by detecting radio communication at a place other than the own vessel 200.

In this embodiment, for ease of understanding, there are only 2 obstacles 204 and 206 along the planned route 202, but the number of obstacles is not limited to only two and may be greater. In various other embodiments, the plurality of obstacles that are planned or threatened to traverse or approach the planned route 202 may include any number of obstacles greater than or equal to two without departing from the scope of the present invention.

In this embodiment, the obstacle information further includes information about other movable bodies, including at least one of other vessels, currents, weather, reefs, and stranded vessels. Information about other movable bodies may be obtained in a manner similar to obtaining information about the multiple obstacles 204 and 206.

As shown in FIG. 1, the navigation planning system 100 includes processing circuitry 1 including a navigation planning route acquiring module 11, a movable body information acquiring module 12, an obstacle information acquiring module 13, a collision risk calculator 14, a congestion risk calculator 15, and a risk evaluator 16. Herein, in addition to FIG. 1, FIGS. 2 and 3 will be described with appropriate reference.

The navigation planning route acquiring module 11 receives the planned route selected by the vessel operator as the planned route 202 and is operable and communicatively connected to the navigation route planning unit 2. The movable body information acquiring module 12 is operable and communicatively connected to the GNSS receiver 3 to receive the movable body information associated with the own vessel 200. In addition, the movable body information acquiring module 12 is configured to store the movable body information received.

The obstacle information acquiring module 13 is operatively connected and able to communicate with the one or the plurality of sensors 4 to receive obstacle information related to the plurality of obstacles 204 and 206. The obstacle information acquiring module 13 is configured to receive obstacle information including the position, the moving direction, and a speed of each of the obstacles 204 and 206 traversing the planned route traversed by the own vessel 200 or approaching the planned route detected by the one or the plurality of sensors 4. In this embodiment, the planned route is the planned route 202 that the own vessel 200 plans to navigate. The obstacle information acquiring module 13 is further configured to store the above obstacle information.

In this embodiment, the movable body information acquiring module 12 periodically acquires movable body information of the own vessel 200, and the obstacle information acquiring module 13 periodically acquires obstacle information of the plurality of obstacles 204 and 206.

The collision risk calculator 14 is operatively connected to the navigation planning route acquiring module 11, the movable body information acquiring module 12, and the obstacle information acquiring module 13, and can communicate with each of them. The collision risk calculator 14 receives the movable body information of the planned route 202, the own vessel 200, and the obstacle information of the plurality of obstacles 204, 206 as the route to be navigated, and calculates the risk obtained by quantifying the risk of collision with the own vessel 200. The calculation of concrete collision risk and congestion risk will be described later.

The collision risk calculator 14 is further configured to calculate a plurality of collision risks for the plurality of obstacles 204 and 206 expected to be on the planned route 202 based on movable body information and obstacle information. The plurality of collision risks may be calculated from the positions, the moving directions, and the speeds of the own vessel 200 and the plurality of obstacles 204 and 206. The plurality of collision risks indicates a risk of collision between own vessel 200 and the plurality of obstacles 204, 206.

In this embodiment, when the obstacle 204 and the obstacle 206 are traveling along the projected future routes 208 and 210, respectively, and the own vessel 200 continues to travel along the planned route, the projected future routes 208 and 210 and the planned route of own vessel 200 may interfere and collide at points as shown in the figure.

As shown in FIGS. 2 and 3, the multiple collision risk associated with the planned route is high, and the collision risk between own vessel 200 and the multiple obstacles 204 and 206 is high. The determination of the collision risk associated with obstacle 204 will be described in detail later with reference to FIGS. 6 to 10.

Referring to FIG. 1, the congestion risk calculator 15 is operatively connected to the collision risk calculator 14 and is configured to communicate with the collision risk calculator 14 to receive the plurality of collision risks associated with the plurality of obstacles 204 and 206 along the planned route 202. Further, here, the congestion risk calculator 15 is configured to determine a congestion risk associated with the planned route 202 along the current route direction based on the plurality of collision risks. The congestion risk indicates the degree of simultaneous approach of the obstacles included in the congestion risk obstacle based on the collision risk corresponding to each of the obstacles included in the risk obstacle in the congestion region.

As an example of the calculation corresponding to the plurality of obstacles 204 and 206, the congestion risk calculator 15 determines the congestion risk corresponding to the planned route 202 based on the logical sum of the plurality of collision risks. In this embodiment, the congestion risk calculator 15 determines the congestion risk of the planned route 202 based on a logical sum of the plurality of collision risks excluding the maximum collision risk among the plurality of collision risks.

The term "logical sum" here refers to a logical sum based on the logic that is true when one or both of two propositions in a logical operation are true and false when both are false, that is, the logical sum based on the number of logic circuits and binary digits is 1 when one or both of the two inputs are 1, and 0 when both are 0. For example, if there are 4 obstacles: Obs (1), Obs (2), Obs (3), and Obs (4), and the collision risks are 0.3, 0.5, 0.7, and 0.9, respectively, the maximum collision risk is 0.9 of Obs (4), and the logical sum of 3 Obs (1) to Obs (3) excluding them is 0.7.

Figure 4:
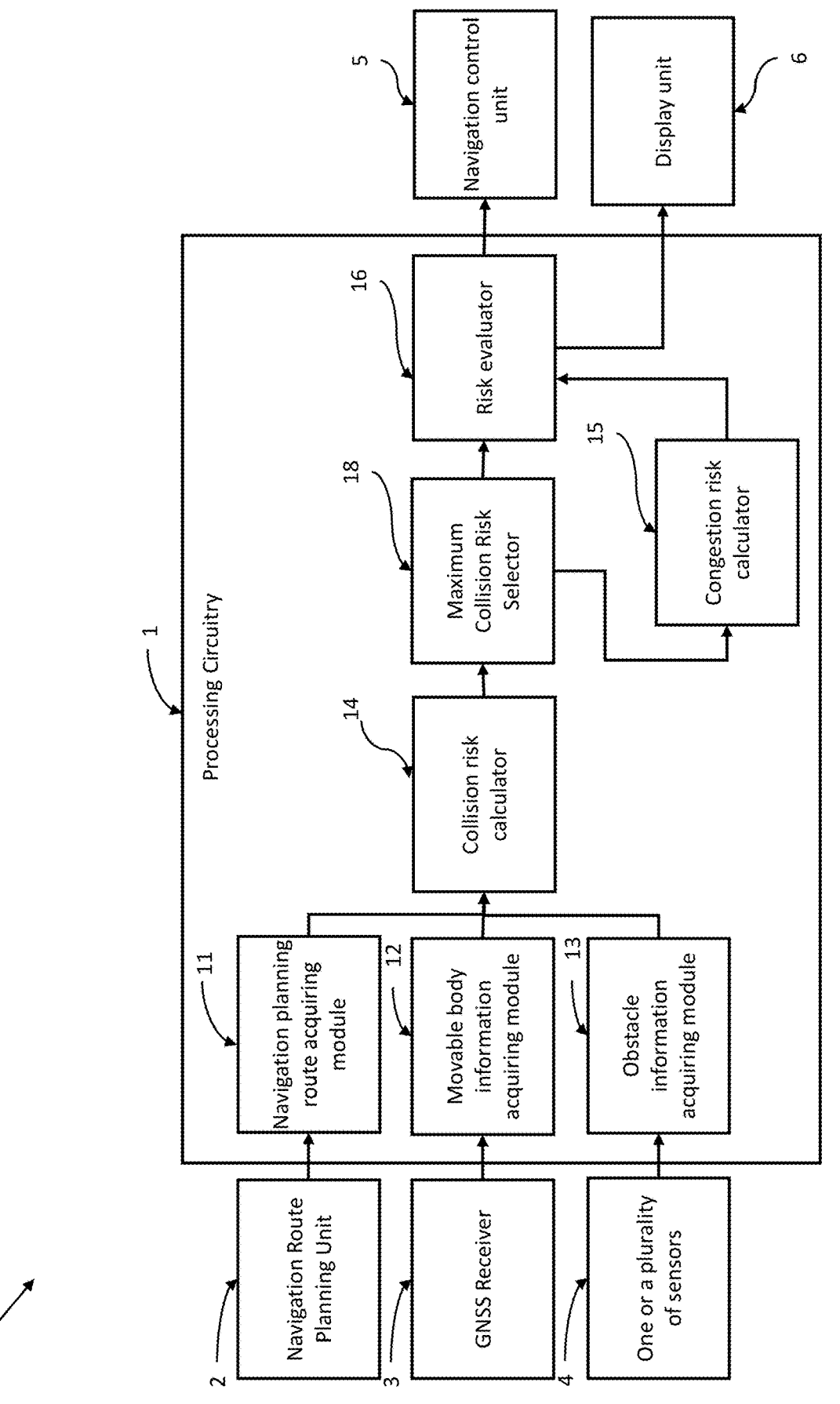
FIG. 4 is a block diagram showing a configuration of a navigation planning system for safely navigating a movable body moving on water by an own vessel or the like, according to another embodiment of the navigation planning system of the present invention.

FIG. 4 is a block diagram showing a configuration of the navigation planning system 100 for safely navigating a movable body moving on water by an operation such as an own vessel according to another embodiment of the navigation planning system of the present invention. The difference from FIG. 1 is that the embodiment shown in FIG. 4 includes a maximum collision risk selector 18.

The maximum collision risk selector 18 selects an obstacle having the maximum collision risk, i.e., the obstacle having the highest collision risk, among the collision risks for each of the plurality of obstacles calculated by the collision risk calculator 14. In this embodiment, as described above, the possibility of collision must be evaluated first for the obstacle having the maximum collision risk, and avoidance action must be taken as necessary.

On the other hand, for the obstacle other than the obstacle having the maximum collision risk, the collision risk caused by the degree of simultaneous approach, i.e., congestion risk, is evaluated. In order to do this, for the set of one or a plurality of obstacles having a collision risk other than the maximum collision risk or the plurality of the obstacles, the collision risk is input by the congestion risk calculator 15, and the congestion risk is calculated.

In this embodiment, since the collision risk with the obstacles having the maximum collision risk is evaluated individually, it may be omitted but included. When the congestion risk is calculated excluding the obstacles having the maximum collision risk, it is more appropriate to calculate the congestion risk by including the obstacles having the sub-maximum risk following the maximum risk.

In evaluating the collision risk, it is better to calculate the congestion risk based on the respective collision risks of one or more other obstacles excluding the obstacles having the maximum collision risk, and evaluate the maximum collision risk and the congestion collision risk separately. The first priority should be to avoid collisions with obstacles having maximum collision risk. The second priority should be to consider other collision risks when performing collision avoidance, for example, collision risks with obstacles including obstacles having second large collision risk with higher collision risk. However, the maximum collision risk may be included in the calculation of the congestion risk.

Figure 5:
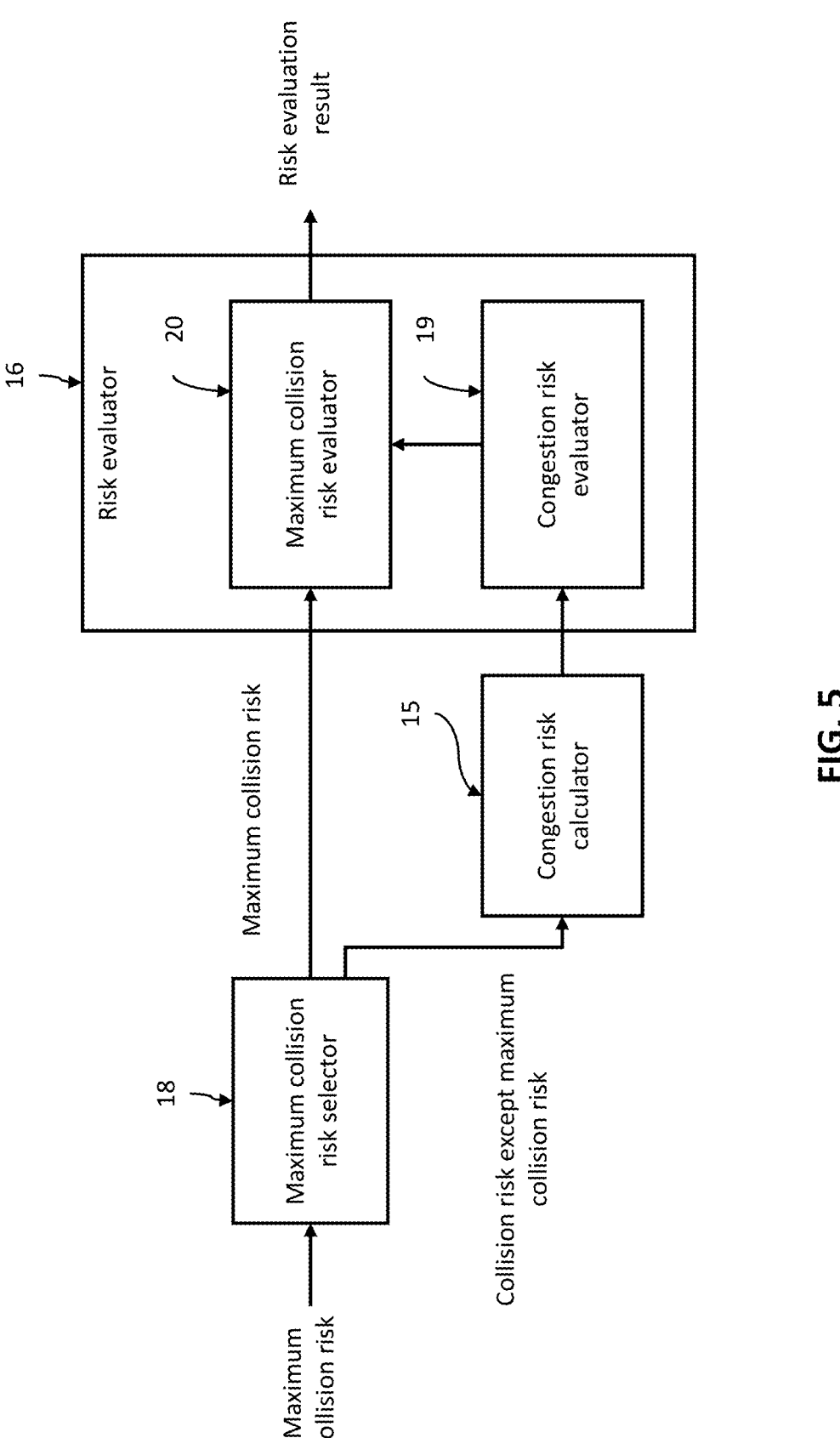
FIG. 5 shows an example of a risk evaluator and its related configuration in an embodiment of the navigation planning system of the present invention.

FIG. 5 is a diagram showing an example of the risk evaluator 16 and its related configuration in an embodiment of the navigation planning system of the present invention. The maximum collision risk selected by the maximum collision risk selector 18 is evaluated by comparing with a predetermined maximum collision risk threshold in a maximum collision risk evaluator 20 in the risk evaluator 16.

On the other hand, the collision risk excluding the maximum collision risk is input to the congestion risk calculator 15 to calculate the congestion risk, which is evaluated by comparing with a predetermined congestion risk threshold in a congestion risk evaluator 19 of the risk evaluator 16.

In this embodiment, the risk evaluator 16 determines that there is no collision risk if both the maximum collision risk and the congestion risk are equal to or less than the respective predetermined thresholds, and outputs the risk evaluation result.

On the other hand, when it exceeds the threshold, it is judged that there is a collision risk. However, when the maximum collision risk is below the threshold, it can be judged that the urgent collision risk is small even when the congestion risk is above the threshold.

As described above, the risk evaluator 16 may operate in conjunction with the congestion risk calculator 15 and acquires the congestion risk associated with the planned route 202. The risk evaluator 16 further determines, based on the congestion risk associated with the planned route 202, whether the own vessel 200 should avoid the planned route 202 or continue navigation along the planned route 202. The potential collision risk may be determined by evaluating the congestion risk of the planned route 202. If the congestion risk is high, the own vessel 200 will navigate a different route, such as the evasion route 212, to avoid the planned route 202 and collision with the multiple obstacles 204 and 206.

In this embodiment, when the risk evaluator 16 determines that the own vessel 200 needs to evade planned route 202 based on the congestion risk, the navigation planning system 100 prompts the vessel operator to navigate the own vessel 200 via evasion route 212 from the current location of the own vessel 200 or the predicted location where the own vessel will navigate in the future, i.e., the reference point (or waypoint) 214 that serves as the origin, as shown in FIGS. 2 and 3. This can be assumed by various means, such as an on-screen warning display or audio.

In this embodiment, when the own vessel 200 is traveling according to planned route 202, the intended route to be traveled is the planned route 202, but it will be apparent to those skilled in the art that the scope of the present invention is not limited thereto. As another embodiment, it may be envisioned that, without departing from the scope of the present invention, the route to be traveled when the own vessel 200 is traveling along the evasion route 212 will be the evasion route 212.

As another embodiment, when the own vessel 200 is traveling along the evasion route 212, the collision risk calculator 14 may determine, based on movable body and obstacle information, multiple collision risks associated with the multiple obstacles 204, 206 along the evasion route 212 (a route scheduled for evasion).

The congestion risk calculator 15 calculates congestion risk associated with evasion route 212 based on multiple collision risks. For example, as described above, the congestion risk calculator 15 calculates congestion risk associated with the evasion route 212 based on the logical sum of multiple collision risks associated with the multiple obstacles 204 and 206. In this embodiment, the congestion risk calculator 15 determines congestion risk of the evasion route 212 based on the logical sum of multiple collision risks excluding maximum collision risk among the multiple collision risks.

The risk evaluator 16 determines, based on the congestion risk associated with the evasion route 212, whether the own vessel 200 should deviate from evasion route 212 or continue on the evasion route 212. The navigation planning system 100 repeats the process of avoiding collision with the plurality of obstacles 204 and 206 along the planned route traversed by the own vessel 200, i.e., the planned route 202 or the evasion route 212, and recalculates and reconfigures the evasion route when the risk of collision is high on the planned route.

Referring to FIGS. 1, 2 and 3, a navigation control unit 5 may be operatively connected to and communicate with the risk evaluator 16. The navigation control unit 5 is configured to monitor and control the navigation of the own vessel 200 based on a determination of whether the own vessel 200 will deviate from the planned route 202, the evasion route 212 configured to evade the obstacle and further evade, or continue navigation along the planned route 202 or the evasion route 212.

The reason that the navigation control unit 5 may deviate from the evasion route 212 once configured to evade the obstacle and further evade it is because it can be assumed that while navigating the evasion route 212, yet another obstacle will approach and must also be further evaded.

To control the navigation of the own vessel 200, the navigation control unit 5 may control the position, direction of movement and speed of the own vessel 200. Based on the determination that the own vessel 200 avoids the planned route 202 or the evasion route 212, the navigation control unit 5 may also navigate the own vessel 200 along a route such as the evasion route 212 or the planned route 202, or an evasion route other than the original evasion route 212.

As an example, based on the actual direction of navigation of the own vessel 200, the current direction of navigation of the own vessel 200 is along the planned route 202, as shown in FIG. 2. In another example, based on the actual direction of navigation of the own vessel 200, the current direction of navigation of the own vessel 200 is along the evasion route 212, as shown in FIG. 3.

A display unit 6 is arranged on the own vessel 200 or electrically connected to the risk evaluator 16 mounted on the own vessel 200 as a vessel instrument for the purposes described below. The planned route 202 to be followed by the own vessel 200 is displayed on the display unit 6.

When own vessel 200 deviates from planned route 202, the display unit 6 displays the evasion route 212 to be navigated by the own vessel 200 to avoid collision with the plurality of obstacles 204 and 206. Also, when the own vessel 200 deviates from the evasion route 212, the display unit 6 displays another evacuation route to be navigated by the own vessel 200 to avoid collision with the plurality of obstacles 204 and 206. Thus, the vessel operator can avoid collision with the plurality of obstacles 204 and 206 and safely navigate the own vessel 200.

Figure 6:
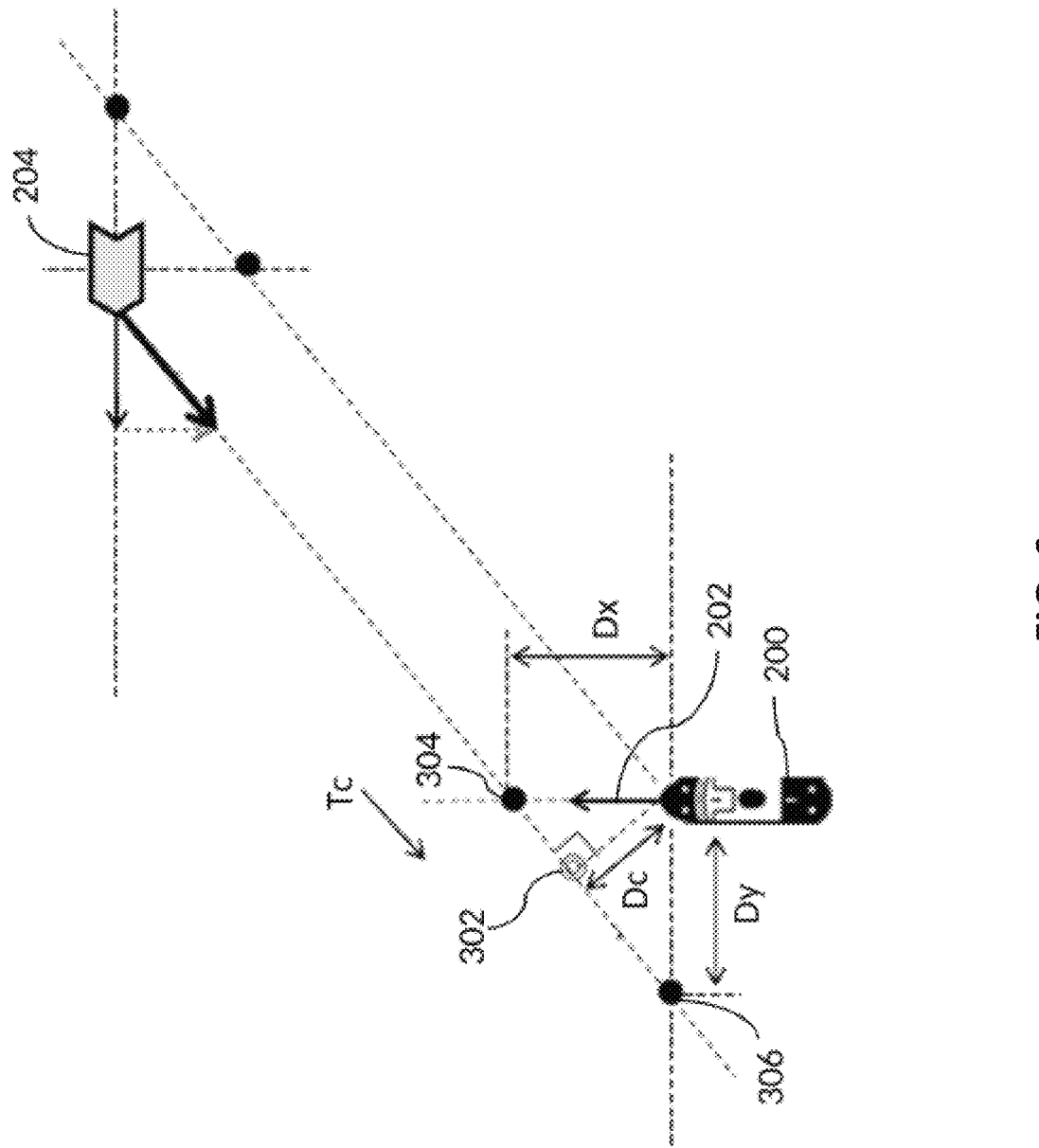
FIG. 6 illustrates the determination of a collision risk associated with an obstacle along a planned route according to an embodiment of the navigation planning system of the present invention.

FIG. 6 illustrates a determination of the collision risk associated with the obstacle 204 along the planned route according to an embodiment of the navigation planning system of the present invention. The collision risk calculator 14 calculates the collision risk for the obstacle 204 based on movable body information and obstacle information. Here, the collision risk of obstacle 204 is determined based on the position, moving the direction and speed of the own vessel 200 and the obstacle 204.

The collision risk calculator 14 is further configured to determine the closest approach distance Dc between the own vessel 200 and the obstacle 204 and the closest approach distance Dx or Dy in a specific direction, or both, based on movable body information and obstacle information. In this embodiment, a closest approach distance Dc is the distance between the current position of the own vessel 200 and the closest approach point 302. In the figure, a closest approach distance Dx in the vertical direction (For example, the direction of navigation as seen from the own vessel 200) is the distance between the current position of the own vessel 200 and a closest approach point 304 in the vertical direction.

A closest approach distance Dy in the vertical direction (In this case, the direction of navigation of the ship is horizontal.) is the distance between the current position of the own vessel 200 and the closest approach point 306 in the horizontal direction. The collision risk calculator 14 calculates the closest approach distance Dc, Dx, and Dy when the own vessel 200 and the obstacle 204 approach from the positional relationship between the own vessel 200 and the obstacle 204, the relative velocity between the own vessel 200 and the obstacle 204, and the moving direction and the velocity between the own vessel 200 and the obstacle 204.

The collision risk calculator 14 calculates the collision risk of the obstacle 204 based on at least one of the closest approach distance Dc between the own vessel 200 and the obstacle 204 and the closest approach distance Dx or Dy in a specific direction.

In this embodiment, when the closest approach distance Dc is less than a predetermined distance and the risk evaluator 16 determines that the collision risk is high, the own vessel 200 needs to avoid the obstacle 204. In this case, the own vessel 200 deviates from the planned route 202 and travels along a different route, i.e., the evasion route 212 to be set. On the other hand, when the closest approach distance Dc is greater than the predetermined distance, the risk evaluator 16 determines that the collision risk is low, and the own vessel 200 may continue to travel along the planned route 202.

In another embodiment, when the closest approach distance Dx or Dy in a particular direction is less than the predetermined distance, and the risk evaluator 16 determines that the collision risk is high, the own vessel 200 must avoid the obstacle 204 by avoiding the planned route and traveling along a different route, i.e., the evasion route. On the other hand, when the closest approach distances Dx and Dy in a particular direction are greater than the predetermined distance, the risk evaluator 16 determines that the collision risk is low, and in this case, the own vessel 200 may continue to travel along the planned route.

In the present embodiment, the collision risk may be calculated by specifying the positional relationship between the own vessel 200 and the obstacle 204 based on the closest approach distance Dx in the vertical direction and/or the closest approach distance Dy in the horizontal direction. Generally, the risk of collision between the own vessel 200 and the obstacle 204 increases when the obstacle 204 crosses in front of the own vessel 200.

In this embodiment, the collision risk calculator 14 is further configured to determine the time Tc required for the own vessel 200 to cross the nearest distance Dc. Based on the nearest approach distance Dc and the time Tc required for the other vessel to reach the nearest approach distance

302, 204 the collision risk calculator 14 determines the collision risk of the obstacle 204 when the own vessel 200 is traveling from the origin (For example, the place of departure) of the planned route 202 to the destination. The time Tc required for the other vessel to reach the nearest approach distance 302 is calculated based on movable body information and obstacle information.

When the collision risk is calculated based on the nearest approach distance Dc between the own vessel 200 and the obstacle 204, the collision risk increases even when the time until own vessel 200 approaches the obstacle 204 is very long. As a result, the own vessel 200 may have to deviate from the planned route to avoid collision with obstacle 204 after some time. Therefore, in this embodiment, the collision risk associated with the obstacle 204 is determined by considering the closest distance Dc between the own vessel 200 and the obstacle 204 and the time Tc required for the own vessel 200 to reach the closest point 302.

As an example, the collision risk for the obstacle 204 is calculated and determined based on the following equation (1).

$$\text{Collision risk value} = \max\ (Dx,\ Dy) * RTc \qquad (1)$$

Figure 7:
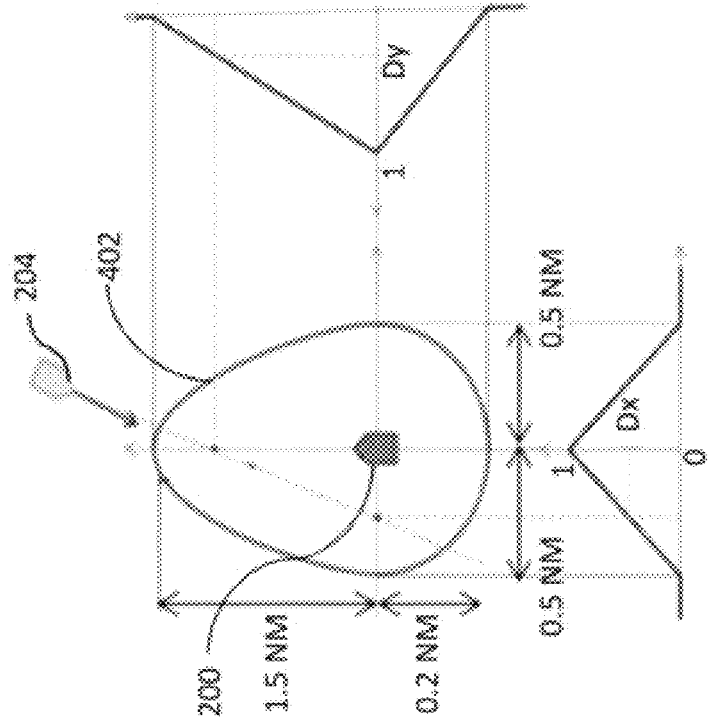
FIG. 7 shows a determination of a collision risk when an own vessel approaches an obstacle, according to an embodiment of the navigation planning system of the present invention.

FIG. 7 shows the determination of the collision risk when the own vessel 200 approaches the obstacle 204 according to an embodiment of the navigation planning system of the present invention. When the obstacle 204 approaches an oval area 402 centered on the own vessel 200, the collision risk increases. Here, as an example, the oval area 402 is determined based on the area within 1.5 NM (nominal mile) in front, 0.2 NM in back, and 0.5 NM on the side of the own vessel 200. As the distance between the own vessel 200 and the obstacle 204 decreases, the collision risk increases. Therefore, the collision risk is inversely proportional to the distance between the own vessel 200 and the obstacle 204.

FIG. 7 further illustrates the relationship between the collision risk and the vertical distance between the own vessel 200 and the obstacle 204, and the relationship between the collision risk and the horizontal distance between the own vessel 200 and the obstacle 204. As an example, FIG. 7 shows the collision risk between the nearest neighbor distances Dx and Dy in the vertical and horizontal directions.

Figure 8:
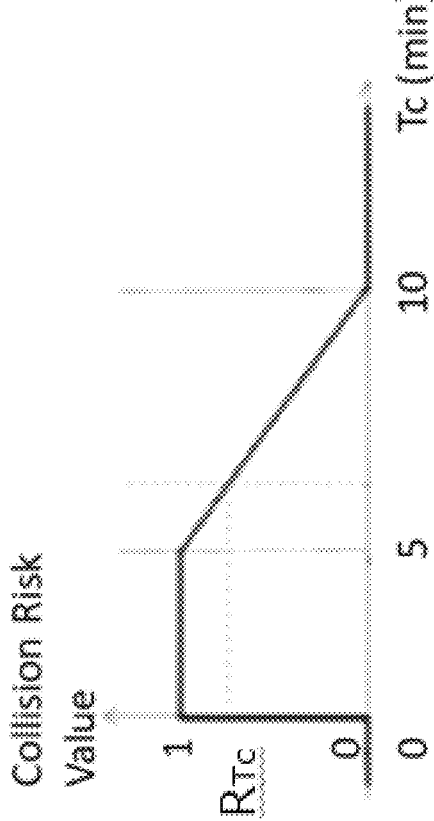
FIG. 8 shows a relationship between the time until the own vessel and the obstacle are located at the nearest distance and the collision risk is shown for the purpose of the description of an embodiment.

FIG. 8 shows the relationship between the collision risk and a time Tc required for another vessel, which is an obstacle to the own vessel 200, to reach the nearest neighbor 302. When the time Tc is small, the collision risk increases. In the example shown here, when the time Tc is less than or equal to a predetermined time, the collision risk is high, and in this state, the maximum is determined to be 1.

Figure 9:
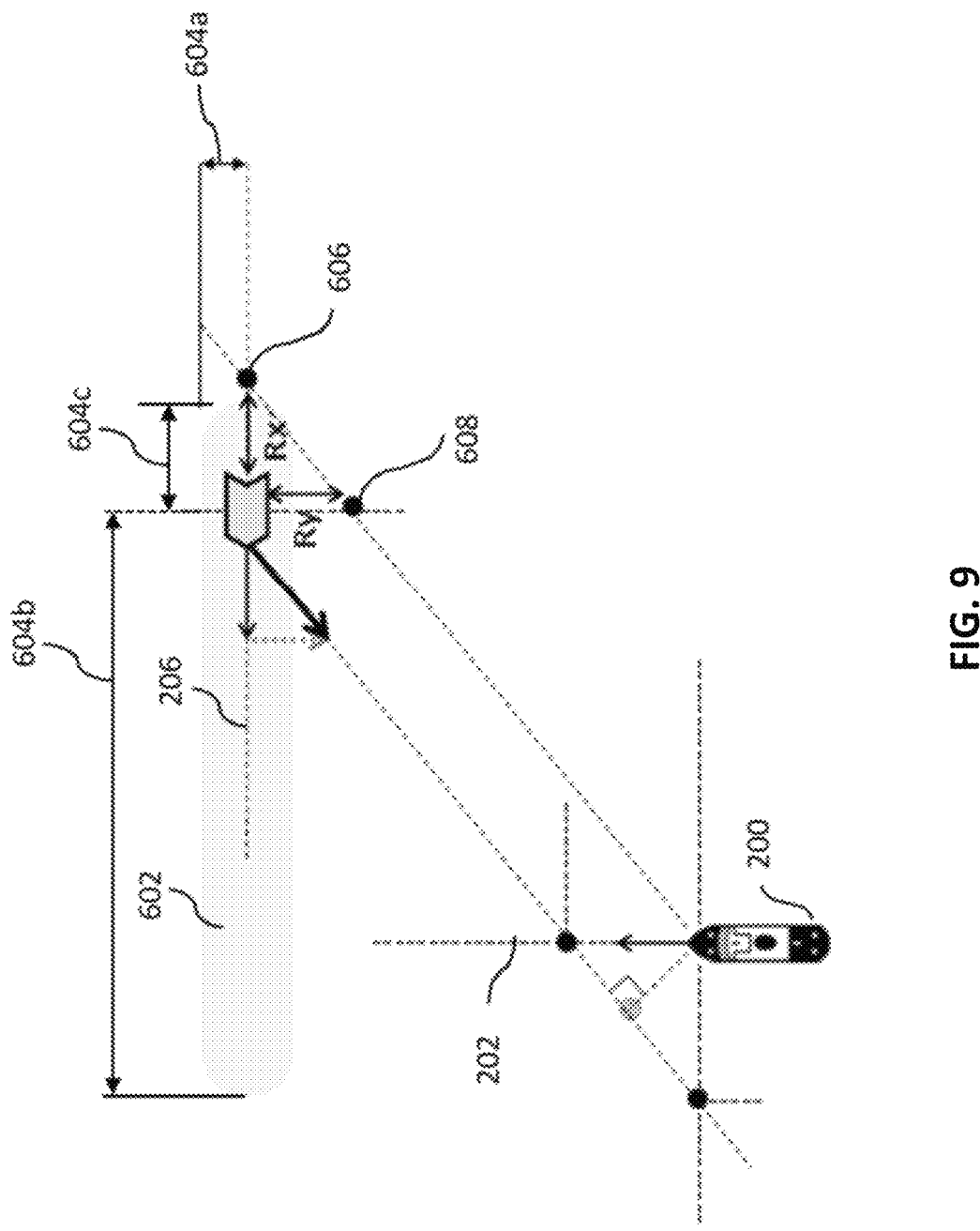
FIG. 9 illustrates the determination of collision risk when an own vessel approaches an obstacle, according to another embodiment of the navigation planning system of the present invention.

FIG. 9 shows another embodiment of the navigation planning system of the present invention determining the collision risk when the own vessel 200 approaches the obstacle 204. An obstacle bumper area 602 of obstacle 204 is determined based on the position, the moving direction, and the speed of the obstacle 204, or vessel. The obstacle bumper area 602 of the obstacle 204 is located on the projected future path 206 of the obstacle 204 based on the direction of movement of the obstacle 204.

The obstacle bumper area 602 of the obstacle 204 includes the surrounding areas of the obstacle 204 and the obstacle 204. The obstacle bumper area 602 of the obstacle 204 may be determined based on the safe passage distances 604a, 604b, and 604c, which are the closest distances allowed on the side, front, and rear of the own vessel 200, respectively, to prevent collisions.

The obstacle bumper area 602 may also correspond to a restricted area, allowing simultaneous recognition of the direction of potential collisions and the distance between the own vessel 200 and the obstacle 204. The closest approach point (relative to obstacle 204) between own vessel 200 and the obstacle 204 in a vertical or horizontal direction 606 or 608 is determined based on the own vessel (movable body) information and the obstacle information. There is no risk of collision when the closest vertical or horizontal point 606 or 608 between the own vessel 200 and the obstacle 204 is outside the obstacle bumper area 602. As shown in FIG. 9, in this embodiment, there is no risk of collision because neither the closest vertical point 606 at a distance of Rx from obstacle 204 nor the closest horizontal point 608 at a distance of Ry is present in the obstacle bumper area 602.

In this embodiment, the collision risk calculator 14 calculates the time required for the own vessel 200 to penetrate into the obstacle bumper area 602 based on the relative speed between the own vessel 200 and the obstacle 204. The collision risk calculator 14 further calculates collision risk of the obstacle 204 based on the time required for the own vessel 200 to penetrate into the obstacle bumper area 602.

Figure 10:
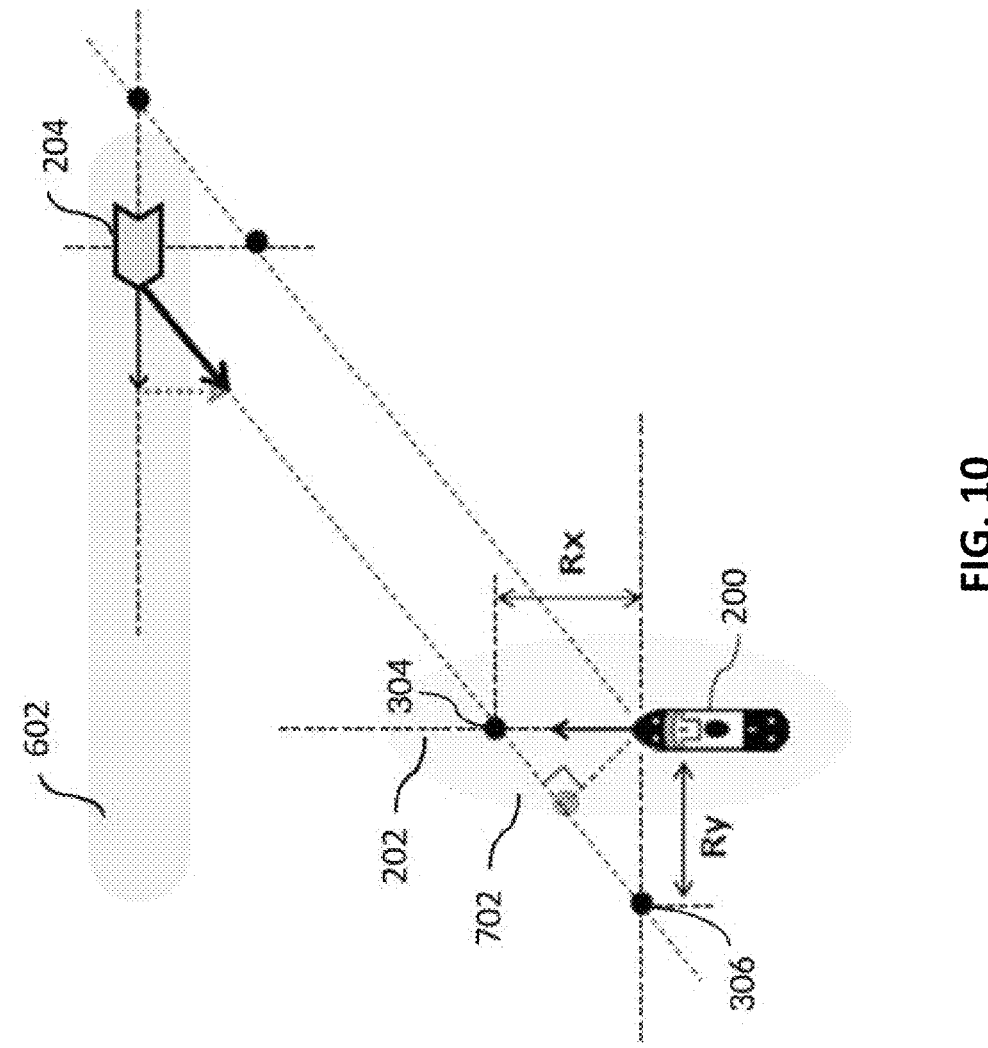
FIG. 10 illustrates the determination of collision risk when an own vessel approaches an obstacle, according to yet another embodiment of the navigation planning system of the present invention.

FIG. 10 illustrates determination of collision risk when the own vessel 200 approaches the obstacle 204 according to yet another embodiment of the navigation planning system of the present invention. A movable body bumper area 702 of the own vessel 200 is determined based on location, direction of movement, and speed of the own vessel 200. The movable body bumper area 702 of the own vessel 200 is located on the intended route (That is, the planned route 202 of this embodiment) of the own vessel 200 based on the direction of movement of the own vessel 200 and includes the own vessel 200 and the surrounding area.

The closest approach point 304 in the vertical direction or the closest approach point 306 in the horizontal direction between the own vessel 200 and the obstacle 204 to the own vessel 200 is calculated based on movable body information and obstacle information. If the closest contact point 304 in the vertical direction and the closest contact point 306 in the horizontal direction between the own vessel 200 and the obstacle 204 are outside the movable body bumper, then there is no risk of collision in the area 702.

As shown in FIG. 10, in this embodiment, there is a risk of collision because the point closest to the vertical direction 304 at a distance Rx from the own vessel 200 is in the movable body bumper area 702. There is a risk of collision if the own vessel 200 continues to navigate in the current direction along the planned route and enters the obstacle bumper area 602 of the obstacle 204.

In this embodiment, the collision risk calculator 14 determines the time required for the movable body bumper area 702 to enter the obstacle bumper area 602 based on the relative speeds of the own vessel 200 and the obstacle 204 based on the respective speeds of the own vessel 200 and the obstacle 204 and the distance between them. The collision risk calculator 14 further calculates the collision risk associated with the obstacle 204 based on the time required for the movable body bumper area 702 to enter the obstacle bumper area 602. The collision risk associated with the obstacle 204 may be determined in a manner like the determination of the collision risk associated with the obstacle 204 described in FIGS. 6 through 10.

Figure 11:
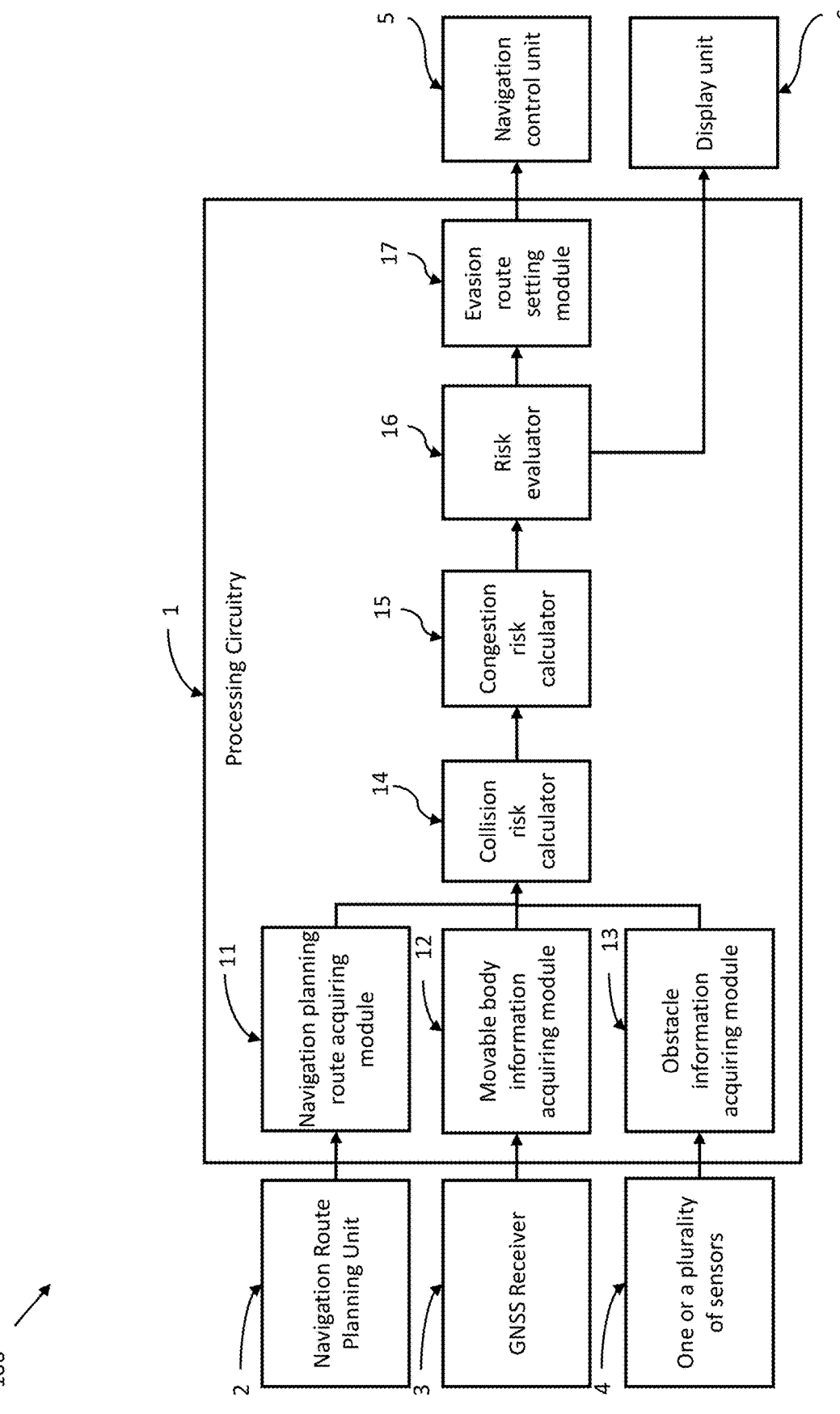
FIG. 11 is a block diagram of a navigation planning system for safely navigating a movable body (or own vessel) according to another embodiment of the navigation planning system of the present invention.
Figure 12:
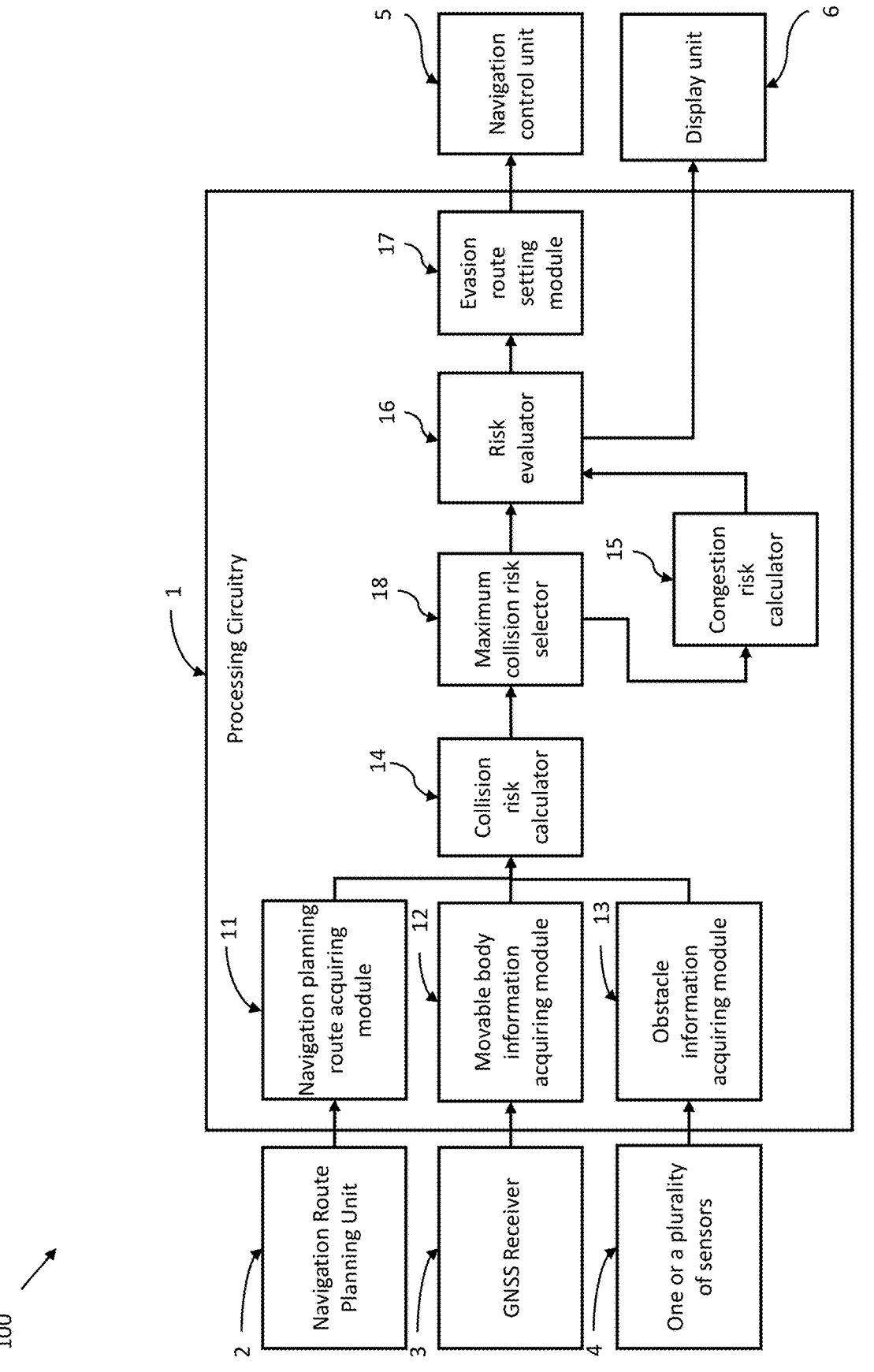
FIG. 12 is a block diagram of a navigation planning system for safely navigating a movable body (or own vessel) according to yet another embodiment of the navigation planning system of the present invention.

Both FIGS. 11 and 12 are block diagrams illustrating the navigation planning system 100 for safely navigating the own vessel 200 according to another embodiment of the navigation planning system of the present invention. There is no difference except that the maximum collision risk is included in the embodiment shown in FIG. 11 and the congestion risk is calculated excluding the maximum collision risk in the embodiment shown in FIG. 12. A difference from an embodiment of the navigation planning system of the present invention shown in FIG. 1 is that the embodiment shown in FIGS. 11 and 12 further includes an evasion route setting module 17 for generating an evasion route.

An embodiment of the navigation planning system 100 shown in FIGS. 1 and 4 primarily evaluates the risk of collision with an obstacle and determines whether to avoid the aircraft. On the other hand, an embodiment of the navigation planning system 100 shown in FIGS. 11 and 12 differs in that it generates an evasion route when it is determined that avoidance is necessary, evaluates the risk of collision of the evasion route, and makes a final decision. Hereinafter, an embodiment according to the configuration shown in FIG. 12 will be described.

Figure 13:
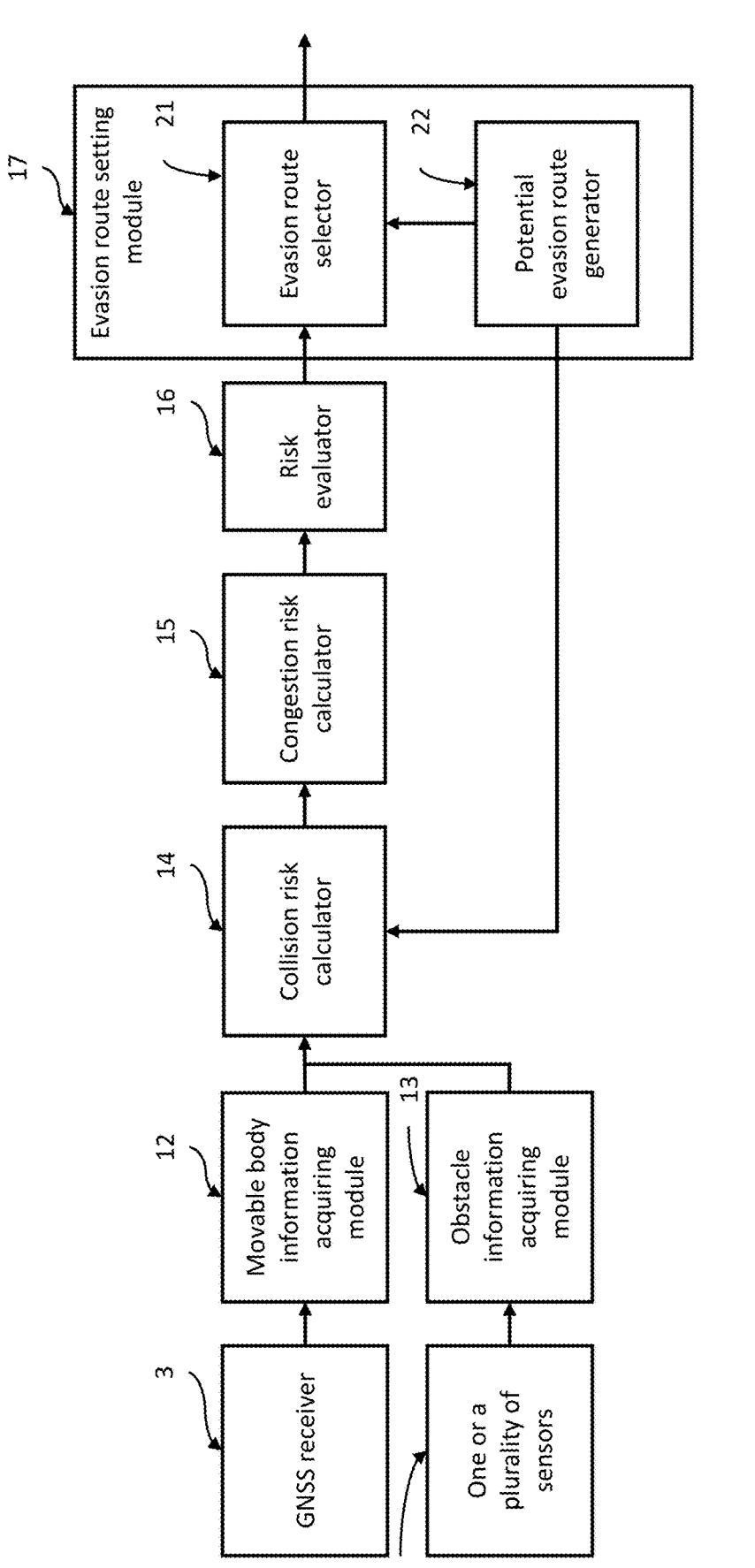
FIG. 13 shows an example of the configuration of an evasion route setting module in the navigation planning system of the present invention.

FIG. 13 is a diagram showing an example of the configuration of an evasion route setting module 17 in the navigation planning system 100 of the present invention. In an embodiment of the navigation planning system of the present invention shown in FIG. 13, the evasion route setting module 17 includes a potential evasion route generator 22 and an evasion route selector 21.

If the collision risk assessment determines that the own vessel 200 should navigate an evasion route out of the planned route, the potential evasion route generator 22 automatically generates one or more potential evasion routes.

Figure 14:
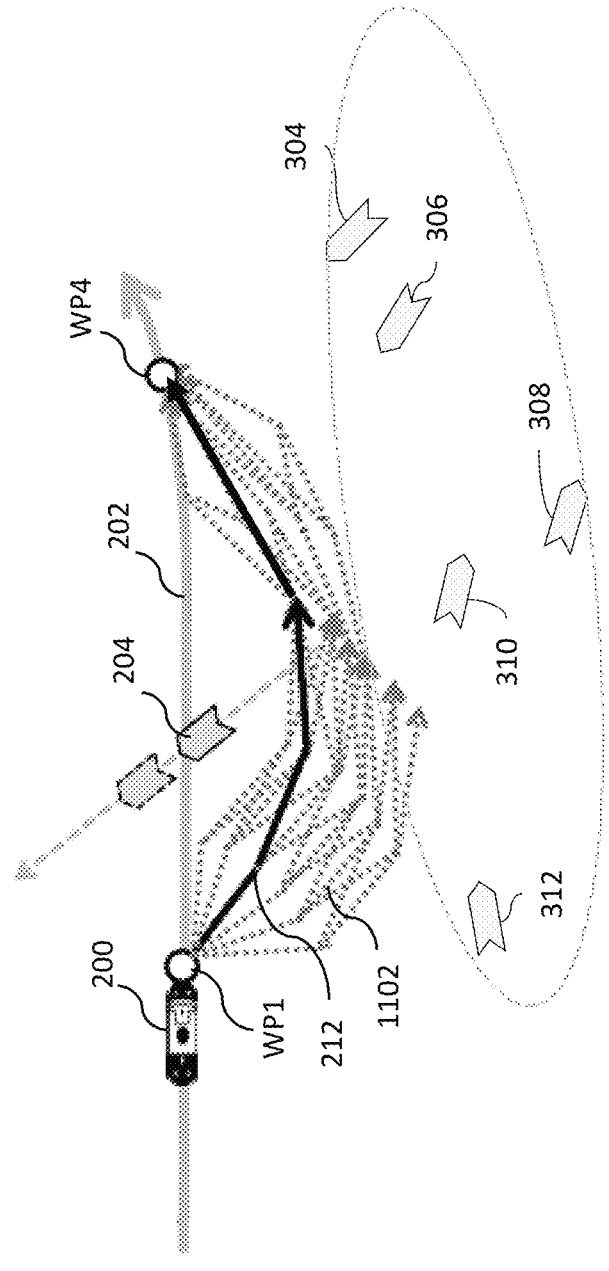
FIG. 14 shows an example of generating a potential evasion route in the navigation planning system of the present invention.

FIG. 14 is a diagram showing an example of generating a potential evasion route in the navigation planning system of the present invention. The potential evasion route generator 22 automatically generates one or more route patterns connecting an evasion starting point WP1 on the planned route 202 to a return point WP4 on the planned route 202. The route patterns may be stored in advance a plurality of nodes connecting the two points and a straight line or curve connecting them and may be superimposed on the evasion starting point WP1 and the return point WP4 to form a potential evasion route, or a curve may be generated by an appropriate function each time.

The positions of the evasion starting point WP1 and the return point WP4 may also be arbitrarily set for each potential evasion route when both points are on the planned route 202. With regards to the evasion starting point WP1, for example, when the collision risk is high, the position where the own vessel is currently sailing may be appropriately set to the evasion starting point WP1. The position of the return point WP4 may be determined according to the distance setting policy of the evasion route as described later.

Referring to FIG. 13, the collision risk calculator 14 calculates the collision risk for each of the plurality of potential evasion routes generated by the potential evasion route generator 22. As shown in FIG. 14, obstacles 204,302, 304,306,308, 310, and 312 having collision risk are captured in the vicinity of the own vessel.

First, the collision risk for the plurality of obstacles in the case of navigating the planned route 202 is calculated, and the maximum collision risk obstacle having the largest collision risk among the obstacles is selected, and the maximum collision risk and congestion risk are calculated. In this case, since the obstacle 204 is applicable and the collision risk is high, it is decided that the evasion route should be set.

Next, in the potential evasion route generator 22, a plurality of potential evasion routes 1102 (patterns indicated by dashed lines) are generated, and a collision risk for the plurality of obstacles and a maximum collision risk obstacle having the largest collision risk are selected for each of them in the same manner as described above, and the maximum collision risk and congestion risk are calculated together. The risk evaluator 16 evaluates the risk for these, and the optimum evasion route 212 is selected.

Next, the collision risk evaluation when the own vessel 200 is traveling along the evasion route 212 outside the planned route 202 will be described.

Figure 15:
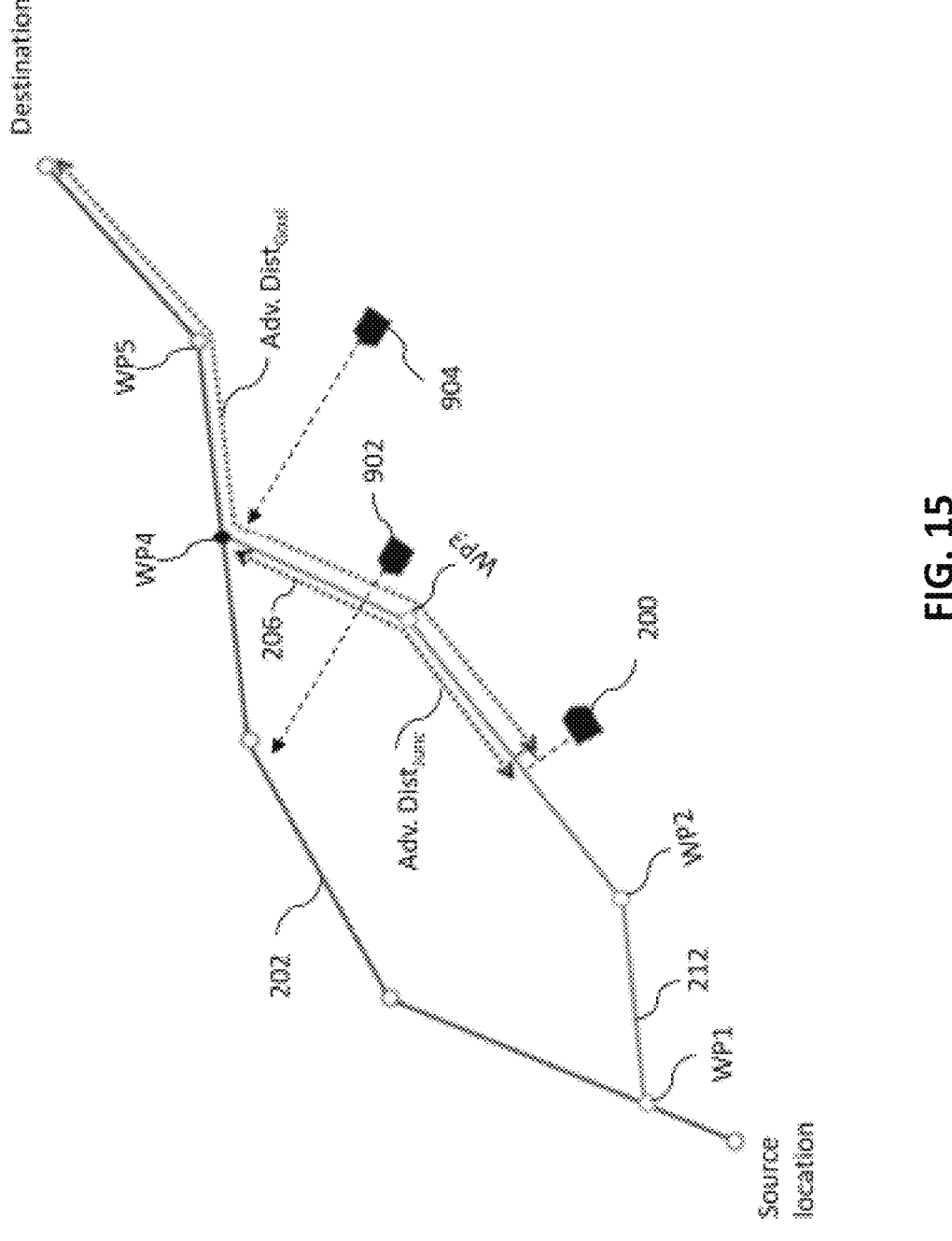
FIG. 15 is a diagram showing an evasion route of an own vessel set when the own vessel (movable body) follows an evasion route, as shown for the purpose of explaining an embodiment.

FIG. 15 shows an area surrounding own vessel 200 when own vessel 200 is traveling along evasion route 212 in accordance with an embodiment of the present invention.

Referring again to FIG. 11, the navigation planning system 100 includes the processing circuitry 1, the navigation route planning unit 2, the GNSS receiver 3, the one or a plurality of sensors 4, the navigation control unit 5, and the display unit 6. The processing circuitry 1 includes the navigation planning route acquiring module 11, the movable body information acquiring module 12, the obstacle information acquiring module 13, the collision risk calculator 14, the congestion risk calculator 15, the risk evaluator 16, and the evolution route setting module 17.

The navigation route planning unit 2, the GNSS receiver 3, the one or the plurality of sensors 4, the navigation planning route acquiring module 11, the movable body information acquiring module 12, the obstacle information acquiring module 13, the collision risk calculator 14, and the risk evaluator 16 function in the same manner as described with reference to FIG. 1.

The evasion route setting module 17 is operationally connected to the risk evaluator 16 and can communicate. The evasion route setting module 17 generates the evasion route 212 of the own vessel 200. The evasion route setting module 17 generates the evasion route 212 on behalf of the risk evaluator 16 as shown in FIG. 1 using the current position 214 or the predicted position as the reference point of the own vessel 200.

In FIG. 15, the predicted location of the own vessel 200 is either a predicted location on the current route, a predicted location on the planned route 202, or a predicted location on the evasion route 212. The evasion route setting module 17 may determine a predicted location based on the current speed and the turning angular velocity of own vessel 200. In this embodiment, the evasion route setting module 17 generates the evasion route 212 based on the maximum collision risk calculated for the plurality of obstacles 204 and 206 and the congestion risk associated with the planned route 202, or planned route.

When the maximum collision risk and congestion risk calculated for the plurality of obstacles associated with the planned route 202 are high, the evasion route setting module 17 generates the evasion route 212 of the own vessel 200 to avoid collisions with the plurality of the obstacles 204 and 206. The generated evasion route 212 can start the evasion route from the evasion starting point (or waypoint) WP1 and return to the planned route 202 with a return point (or waypoint) WP4 to the planned route 202. A vessel operator, i.e., a user operating own vessel 200, may navigate own vessel 200 along the generated evasion route 212 to avoid collisions with the multiple obstacles 902, 904.

In another embodiment, the own vessel 200 travels the evasion route 212, and the evasion route setting module 17 determines whether to replay evasion route 212 based on multiple obstacles such as obstacles 902, 904 along the evasion route 212. In this embodiment, the planned route is the evasion route 212.

When the evasion route is regenerated, the collision risk calculator 14 determines the current collision risk associated with the planned route based on multiple collision risks for multiple obstacles attempting to traverse or approach the planned route.

When the current collision risk associated with the planned route is high, the risk of collision between the own vessel 200 and multiple obstacles increases. The current collision risk may be indicated by a number between 0 and 1. The collision risk is not limited to the evaluation based on the above number, and the degree of risk may be set in an arbitrary range. In addition, the present collision risk indicates the degree of approach when the own vessel 200, when navigating the planned route while maintaining the same speed, focuses on the most dangerous target among the surrounding targets.

Furthermore, the collision risk calculator 14 calculates the evasion collision risk associated with the generated evasion route based on the plurality of collision risks for the plurality of obstacles along the evasion route.

When the calculated evasion collision risk in the evasion route is high, the risk of collision between own vessel 200 and multiple obstacles is high. The evasion collision risk indicates the degree of danger due to the approach of the own vessel 200 when it is focused on the obstacle with the highest risk of collision among the surrounding obstacles when it is navigating the evasion route while maintaining the same speed. The evasion collision risk may be indicated by a number from 0 to 1, but it is not limited to the evaluation by the above number, and the risk of collision may be set in any range.

The congestion risk calculator 15 is further configured to calculate and determine the congestion risk for the planned route and the congestion risk for the evasion route. Here, the congestion risk indicates the degree to which a plurality of peripheral obstacles, except for the obstacle with the greatest risk of collision, approach simultaneously when the own vessel 200 is navigating the planned route while maintaining the same speed.

The congestion risk is calculated based on the respective collision risk for the plurality of obstacles and is calculated by the logical sum of them. The congestion risk for planned and evasion routes may be indicated by a number in the range of 0 to 1 and is indicated here by a number in the range of 0 to 1. The method of setting the number and the range thereof may be arbitrarily set.

The congestion risk for planned routes is higher when the number of obstacles simultaneously approaching the own vessel 200 is large. When only one obstacle is approaching the own vessel 200, in the example shown here, the maximum collision risk obstacle subject to the maximum collision risk is excluded, and the congestion risk is 0 when the congestion risk is calculated. When multiple obstacles (for example, other vessels) are approaching the own vessel 200, the number of both collision risk and congestion risk will be different.

For example, the collision risk and congestion risk in the case of multiple obstacles will be determined based on the following equations (2) and (3).

$$\text{Max}\,(a, b) = \text{(the greater of } a \text{ and } b) \tag{2}$$

-continued $$1 - \prod_{(a,b)} (1 - (a, b)) = 1 - (1 - a)(1 - b) \quad (3)$$

In this embodiment, the collision risk can be calculated for each of the plurality of obstacles, and the plurality of obstacles are numbered 'N'. In this example, the collision risk of the plurality of obstacles is calculated by applying the following equations (2) to (4).

$$\text{Risk}_{coll} = \max_{i=1,N} (\text{Risk}i) \quad (4)$$

where N indicates the number of the obstacle.

In this embodiment, by applying the following equations (3) to (5), the congestion risk is determined based on the collision risk ki determined for each obstacle excluding the obstacle with the largest collision risk.

$$\text{Risk}_{Cong} = 1 - \prod_{(i=1,N-1)} (1 - \text{Risk}i) \quad (3)$$

Referring to FIG. 11, the navigation control unit 5 is operatively connected to and can communicate with the evasion route setting module 17. The navigation control unit 5 is configured to monitor and control the navigation of the own vessel 200 and, based on movable body and obstacle information, controls the own vessel 200 to navigate off the planned route 202 when it is determined that a collision must be avoided. This allows the vessel operator to avoid collisions with multiple obstacles when the collision risk is high and to safely navigate the own vessel 200 along the planned route or the evasion route.

In the present embodiment, the display unit 6 is external to the processing circuitry 1, but it will be apparent to those skilled in the art that the navigation planning system 100 of the present invention is not limited thereto. In another embodiment, the display unit 6 is internal to the processing circuitry 1 without departing from the scope of the present invention.

A route planning method 1200 according to an embodiment of the present invention will be described with appropriate reference to the flow charts shown in FIGS. 16 and 17.

In step 1202, the navigation planning route acquiring module 11 receives the planned route 202, which is the route of the own vessel 200. The navigation route planning unit 2 may provide one or more routes for the navigation of the own vessel 200 from the place of departure to the destination.

In step 1204, the obstacle information acquiring module 13 receives obstacle information from one or a plurality of sensors 4. The obstacle information includes the position, movement direction, and speed of the plurality of obstacles 204, 206 (or 902 or 904). The obstacle information may include one or more additional pieces of information related to other movable bodies, such as other vessels, currents, weather, reefs, stranded vessels, etc.

In step 1206, the movable body information acquiring module 12 receives movable body information, such as the location, the moving direction, and the speed of the own vessel 200.

In step 1208, the collision risk calculator 14 determines a plurality of collision risks associated with the planned route of the own vessel 200 based on movable body information and obstacle information. In one embodiment, the route to be navigated is the planned route 202, but in another embodiment, the route to be navigated may be evasion route 212.

In step 1210, if the risk evaluator 16 determines that navigation along the planned route is associated with a low collision risk, and the own vessel 200 determines that there is no need to evade the planned route and no need to generate an evasion route, step 1204 is performed.

In step 1210, if the risk evaluator 16 determines that there is a high collision risk along the planned route and that there is a need to request the own vessel 200 and generate an evasion route to evade the planned route, step 1212 is performed.

In step 1212, the evasion route setting module 17 generates the own vessel 200 evasion route and displays the evasion route on the screen of the display unit 6. In step 1214, the collision risk calculator 14 determines the plurality of collision risks associated with the plurality of obstacles along the planned route. The collision risk calculator 14 determines the collision risks for the planned route and the evasion route, respectively.

In step 1216, the congestion risk calculator 15 calculates the congestion risk of the planned route, the congestion risk of the evasion route, and the distance to reach the confluence point of the own vessel (return point to the planned route), respectively.

In step 1218, the risk evaluator 16 excludes the evasion route exceeding the congestion risk of the planned route from the candidates. In step 1220, the evasion route exceeding the prescribed congestion risk is excluded from the candidates.

In step 1222, the one with the shortest distance to reach the confluence is selected as the evasion route of the movable body (own vessel). Then, in step 1224, the movable body (own vessel) navigates along the evasion route.

As described above, in the navigation planning system 100 of the present invention, the vessel operator, that is, the operator operating the own vessel, may safely navigate the own vessel 200 by avoiding collisions or conflicts with a plurality of surrounding obstacles such as other vessels or landforms that become obstacles in the planned route (planned route 202 or evasion route 212) and the generated evasion route (evasion route 212 or other evasion route) displayed on the screen of the display unit 6.

Although the above is a description of embodiments of the navigation planning system and the route planning method of the present invention, various exemplary logical blocks and parts described in connection with the embodiments of the present invention may be implemented or executed by machines such as processors.

The processor may be a microprocessor, controller, microcontroller, state machine, or a combination thereof. The processor may include an electrical circuit configured to process executable instructions of the computer. In another embodiment, the processor may include an application-specific integrated circuit (ASIC), a field programmable gate array (FPGA), or other programmable device that performs logical operations without processing executable instructions of the computer.

The processor may also be implemented as a combination of computing devices, for example, a combination of a digital signal processor (DSP) and a microprocessor, a plurality of microprocessors, one or more microprocessors combined with a DSP core, or other such configuration.

Although primarily digital technology will be discussed herein, the processor may also include primarily analog components. For example, some or all of the signal processing algorithms described herein may be implemented by analog circuits or mixed analog and digital circuits.

The computing environment may include any type of computer system including, but not limited to, a microprocessor, mainframe computer, digital signal processor, portable computing device, device controller, or computer system based on a computing engine within the device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A navigation planning system, comprising:
processing circuitry configured to:
acquire planned route information indicating a movable body on the water;
acquire movable body information including a position, a moving direction, and a speed of the movable body;
acquire obstacle information including each of a position, a moving direction, and a speed of a plurality of obstacles located in a surrounding area of the movable body;
calculate a collision risk indicating a risk level of collision between the movable body and an obstacle of the plurality of obstacles based on the movable body information and the obstacle information;
calculate congestion risk indicating a degree of approaching the plurality of obstacles simultaneously based on the collision risk between the movable body and each of the plurality of obstacles;
select a maximum collision risk obstacle corresponding to a maximum collision risk among the plurality of obstacles;
compare the maximum collision risk with a maximum collision risk threshold;
determine necessity of evasion by comparing the congestion risk with the maximum collision risk threshold; and
set and implement an evasion route different from the navigation planning route for a part of or entire unnavigated route of the navigation planning route when the processing circuitry determines the necessity of the evasion route.

2. The navigation planning system of claim 1, wherein the processing circuitry is further configured to:
generate one or a plurality of potential evasion routes different from the planned route between an evasion starting point and a return point on the unnavigated route; and
select the evasion route from the plurality of potential evasion routes based on the maximum collision risk and the congestion risk.

3. The navigation planning system of claim 2, wherein the processing circuitry is further configured to:
calculate the congestion risk of the planned route based on a logical sum of the plurality of collision risks.

4. The navigation planning system of claim 3, wherein the processing circuitry is further configured to:

calculate the congestion risk based on the collision risks including the maximum collision risk from the plurality of collision risks.

5. The navigation planning system of claim 3, wherein the processing circuitry is further configured to:
calculate the congestion risk based on the plurality of collision risks excluding the maximum collision risk and including a second largest collision risk among the plurality of collision risks.

6. The navigation planning system of claim 5, wherein the processing circuitry is further configured to:
calculate the congestion risk for each of the potential evasion routes based on the plurality of collision risks.

7. The navigation planning system of claim 6, wherein the processing circuitry is further configured to:
calculate the maximum collision risk for each of the one or more potential evasion routes; and
calculate the congestion risk for each of the one or more potential evasion routes.

8. The navigation planning system of claim 7, wherein the processing circuitry is further configured to:
calculate the maximum collision risk for each of the potential evasion routes when the movable body navigates the potential evasion route;
select the evasion route for which the maximum collision risk is equal to or less than the threshold; and
determine to allow to switch the planned route to the evasion route when the maximum collision risk corresponding to the selected evasion route is less than the maximum collision risk for the planned route.

9. The navigation planning system of claim 8, wherein the processing circuitry is further configured to:
calculate the congestion risk of the evasion route when the movable body navigates the selected evasion route, and
determine to allow to switch the planned route to the evasion route when the congestion risk corresponding to the selected evasion route is less than the congestion risk for the planned route.

10. The navigation planning system of claim 9, wherein the processing circuitry is further configured to:
select the evasion route in which the distance traveled by the movable body is minimized among the plurality of potential evasion routes in which the maximum collision risk and the congestion risk value are both equal to or less than a predetermined threshold.

11. The navigation planning system of claim 1, wherein the processing circuitry is further configured to:
when the processing circuitry determines the necessity of the evasion route, generate one or a plurality of potential evasion routes different from the planned route between an evasion starting point and a return point on the unnavigated route;
select the evasion route from the plurality of potential evasion routes based on the maximum collision risk and the congestion risk; and
set the evasion route different from the navigation planning route for a part of or entire unnavigated route of the navigation planning route.

12. The navigation planning system of claim 11, wherein the processing circuitry is further configured to:
calculate the congestion risk of the planned route based on a logical sum of the plurality of collision risks.

13. A navigation route planning method, comprising:
acquiring planned route information indicating a movable body on the water;
acquiring movable body information including a position, a moving direction, and a speed of the movable body;

acquiring obstacle information including each of a position, a moving direction, and a speed of a plurality of obstacles located in the surrounding area of the movable body;

calculating a collision risk indicating a risk level of collision between the movable body and an obstacle of the plurality of obstacles based on the movable body information and the obstacle information;

calculating congestion risk indicating a degree of approaching the plurality of obstacles simultaneously based on the collision risk between the movable body and each of the plurality of obstacles;

selecting a maximum collision risk obstacle corresponding to a maximum collision risk among the plurality of obstacles;

comparing the maximum collision risk with a maximum collision risk threshold;

determining necessity of evasion by comparing the congestion risk with the maximum collision risk threshold; and setting and implementing an evasion route different from the navigation planning route for a part of or entire unnavigated route of the navigation planning route when the processing circuitry determines the necessity of the evasion route.

14. The navigation route planning method of claim 13, further comprising:

generating one or a plurality of potential evasion routes different from the planned route between an evasion starting point and a return point on the unnavigated route;

calculating the maximum collision risk for each of the one or more potential evasion routes and the congestion risk for each of the one or more potential evasion routes; and determining the evasion route based on the calculated maximum collision risk and the congestion risk.

15. The navigation route planning method of claim 14, further comprising:

selecting the evasion route in which the distance traveled by the movable body is minimized among the plurality of potential evasion routes in which the maximum collision risk and the congestion risk value are both equal to or less than a predetermined threshold.

* * * * *